United States Patent
Resso et al.

(10) Patent No.: US 8,590,235 B2
(45) Date of Patent: Nov. 26, 2013

(54) ANCHORING SYSTEM FOR A ROOF PANEL SYSTEM

(75) Inventors: Frank Resso, Newman, GA (US); George Jones, Alpharetta, GA (US); Ron Nelson, Cumming, GA (US); Mike Huber, Akron, OH (US); John Pierson, Chesterland, OH (US)

(73) Assignee: Garland Industries, Inc., Cleveland, OH (US)

( * ) Notice: Subject to any disclaimer, the term of this patent is extended or adjusted under 35 U.S.C. 154(b) by 266 days.

(21) Appl. No.: 12/783,653

(22) Filed: May 20, 2010

(65) Prior Publication Data
US 2010/0307084 A1    Dec. 9, 2010

Related U.S. Application Data

(60) Provisional application No. 61/183,728, filed on Jun. 3, 2009.

(51) Int. Cl.
*E04F 17/00* (2006.01)

(52) U.S. Cl.
USPC ............... 52/302.1; 52/465; 52/466; 52/467; 52/468; 52/520; 52/173.3

(58) Field of Classification Search
USPC ........ 52/520, 533, 543, 544, 546, 551, 489.1, 52/478, 461, 463, 465, 466, 467, 468, 469, 52/470, 471; 126/621, 622, 623
See application file for complete search history.

(56) References Cited

U.S. PATENT DOCUMENTS

| | | |
|---|---|---|
| 2,736,406 A | 2/1956 | Johnson |
| 3,495,368 A | 2/1970 | Krause |
| 4,089,326 A | 5/1978 | Andrassy |
| 4,111,188 A | 9/1978 | Murphy, Jr. |
| 4,114,340 A | 9/1978 | Dean et al. |
| 4,114,598 A | 9/1978 | Van Leeuwen |
| 4,120,123 A | 10/1978 | Knudson |
| 4,174,703 A | 11/1979 | Blakey et al. |
| 4,204,520 A | 5/1980 | Rosenberg |

(Continued)

FOREIGN PATENT DOCUMENTS

| | | |
|---|---|---|
| DE | 3000289 | 5/1980 |
| FR | 2323109 | 9/1975 |
| SU | 1672183 | 12/1988 |

OTHER PUBLICATIONS

Your Alternative Energy Solution is Right Ovehead.; Dawn Solar Integrated PV Thermal Systems; Dawn Solar Systems, Inc. Copyright 2009.

(Continued)

*Primary Examiner* — James Buckle, Jr.
(74) *Attorney, Agent, or Firm* — Fay Sharpe LLP

(57) ABSTRACT

An anchoring clip system that includes an anchoring clip that has a top flange portion and a base flange that can be connect to a substructure, and a cap member designed to be inserted over a portion of the roof panels so as to secure the roof panels to the anchoring clip. The anchoring clip system can optionally be designed to allow for fluid flow through or on one or more components of the anchoring clip system. The anchoring clip system can optionally include a locking crown that improves the wind uplift resistance of the panels.

17 Claims, 15 Drawing Sheets

(56) References Cited

U.S. PATENT DOCUMENTS

| | | | |
|---|---|---|---|
| 4,216,762 A | 8/1980 | Klaila | |
| 4,221,208 A | 9/1980 | Murphy, Jr. | |
| 4,263,896 A | 4/1981 | Zebuhr | |
| 4,269,172 A | 5/1981 | Parker et al. | |
| 4,319,437 A | 3/1982 | Murphy | |
| 4,338,921 A | 7/1982 | Harder et al. | |
| 4,366,656 A | 1/1983 | Simpson | |
| 4,390,010 A | 6/1983 | Skillman | |
| 4,538,391 A * | 9/1985 | Skrabis et al. | 52/478 |
| 4,635,710 A | 1/1987 | Shelley | |
| 4,646,500 A | 3/1987 | Smith | |
| 4,649,684 A | 3/1987 | Petree et al. | |
| 4,738,247 A | 4/1988 | Moore | |
| 4,750,473 A | 6/1988 | Dunn | |
| 4,833,853 A | 5/1989 | Deibele et al. | |
| 4,870,798 A | 10/1989 | Richter | |
| 5,092,939 A * | 3/1992 | Nath et al. | 136/251 |
| 5,193,321 A * | 3/1993 | Edwards | 52/466 |
| 5,363,624 A | 11/1994 | Cotter | |
| 5,367,848 A | 11/1994 | McConnohie | |
| 5,636,488 A | 6/1997 | Lawrence et al. | |
| 5,704,509 A * | 1/1998 | Rosenkrantz | 220/216 |
| 5,715,639 A | 2/1998 | Yamada | |
| 5,845,446 A | 12/1998 | Funaki et al. | |
| 6,289,646 B1 | 9/2001 | Watanabe | |
| 6,354,045 B1 * | 3/2002 | Boone et al. | 52/95 |
| 6,401,412 B1 | 6/2002 | Cooper et al. | |
| 6,715,256 B1 | 4/2004 | Fischer | |
| 6,796,097 B2 | 9/2004 | Fensel et al. | |
| 7,104,020 B1 | 9/2006 | Suttle | |
| 7,231,744 B2 | 6/2007 | Cooper et al. | |
| 7,565,775 B2 | 7/2009 | Cooper et al. | |
| 7,603,825 B2 | 10/2009 | Dohren | |
| 7,661,234 B2 * | 2/2010 | Voegele, Jr. | 52/466 |
| 8,024,906 B1 | 9/2011 | Nelson et al. | |
| 2003/0051427 A1 | 3/2003 | Tang | |
| 2003/0106277 A1 | 6/2003 | Heusel | |
| 2003/0188500 A1 * | 10/2003 | Voegele | 52/466 |
| 2004/0020150 A1 | 2/2004 | Fensel et al. | |
| 2004/0163351 A1 | 8/2004 | Rood, Jr. | |
| 2006/0277846 A1 | 12/2006 | Olsson | |
| 2007/0033893 A1 * | 2/2007 | Voegele, Jr. | 52/466 |
| 2010/0236542 A1 | 9/2010 | Pierson et al. | |
| 2010/0307084 A1 | 12/2010 | Resso et al. | |
| 2011/0016811 A1 | 1/2011 | Kalkanoglu et al. | |
| 2011/0138710 A1 | 6/2011 | Reisdorf et al. | |
| 2011/0179726 A1 | 7/2011 | Pao et al. | |
| 2011/0219719 A1 | 9/2011 | Stol et al. | |
| 2011/0220093 A1 | 9/2011 | Fernandez-Fernandez | |
| 2011/0232212 A1 | 9/2011 | Pierson et al. | |

OTHER PUBLICATIONS

Roof Hugger Eco-Fit, Energy Efficient Re-roofing Technologies that Turn an Expense into an Investment, Copyright Roof Hugger, Inc.—Nov. 2009.

\* cited by examiner

ANCHORING SYSTEM FOR A ROOF PANEL SYSTEM

The present invention claims priority on U.S. Provisional Patent Application Ser. No. 61/183,728 filed Jun. 3, 2009, which is fully incorporated herein.

The present invention relates to an improved anchoring system for use with a roof panel system to provide resistance to wind uplift forces. In particular, the improved anchoring system is used to join adjacent roof panels in a standing seam roof configuration. Furthermore, the improved anchoring system can optionally be used as part of a solar roof system to collect energy from components of the roof system.

BACKGROUND OF THE INVENTION

Wind uplift is an important consideration in the design of roofing systems, especially panel roof systems. Several areas on a roofing surface can have distinct wind uplift requirements as compared to other areas on a roof system. For instance, the corner regions and edge regions of roofing systems are generally exposed to greater wind uplift forces than other regions of a roofing surface; however, this is not always the situation. Likewise, snow accumulation on the roof surface is most often not uniform, resulting in greater roof loads at eave edges, valleys, and headwall conditions; however, this is not always the situation.

Several types of anchoring systems have been designed to address the wind uplift requirements of paneled roofing systems. One such anchoring system is disclosed in U.S. Pat. No. 4,649,684, which is incorporated herein by reference. The '684 patent discloses a panel system for joining adjacent panels which uses a plurality of spaced-apart bent metal clips that are aligned along the standing wall portions of adjacent panels to affix the panels to a building substructure. The '684 patent discloses that first and second panels that include flanges are connected together by a specially designed anchoring clip. The base of the anchoring clip includes a pair of spaced apart raised portions and an opening in the base that is positioned between the raised portions. The anchoring clip includes a wall that has a lip extending therefrom. The upper surface of the lip and the raised portions are disclosed as lying in substantially the same plane. The top of the wall includes a plurality of tabs or projections that lie in a plane substantially parallel with the bottom of the base of the anchoring clip. The anchoring clips are designed to be connected at a spaced apart relation to one another on a sub-structure. The tabs or projections on the top of the wall of the anchoring clip are inserted into a groove in the flange portion of adjacently positioned roofing panels. A batten cap or cover is then snapped over the grooved portion of the roof panels so as to secure the ends of the roof panels to the anchoring clip.

Another type of anchoring system is disclosed in U.S. Pat. No. 6,354,045, which is incorporated herein by reference. This anchoring system is disclosed as being an improvement over the anchoring system as disclosed in the '684 patent. The '045 patent discloses that the roof panels that are used with the anchoring system include a horizontal channel section bounded on opposing edges by a pair of side flanges. This roof panel configuration is similar to that disclosed in the '684 patent. The anchoring clip includes a pair of oppositely extending base flanges and a pair of oppositely extending top flanges. The base flanges and top flanges are positioned along a vertical web or wall member. Each of the top flanges is adapted to be received in the channel of panels. A cap member or batten cap is used to secure the roof panels to the anchoring clips. The anchoring clip can optionally include a pair of oppositely extending shelf members, one on each side of the vertical web or wall member, so that each shelf member is positioned below the top flanges and is designed to bear the weight of the roof panels when the roof panel is deflected and acts to limit deflection of the panel side wall.

Although the roof panel systems disclosed in U.S. Pat. Nos. 4,649,684 and 6,354,045 have improved the uplift resistance of the metal roof panels installed on various roof systems, there is a continued need to improve such uplift resistance, especially in regions that are prone to high wind velocities (e.g., coastal regions subjected to hurricanes, etc.)

Roof systems are more and more being used to collect energy for conversion into electricity and/or for heating purposes. One common arrangement is to place heat absorbing materials on the roof system and then run fluid lines on the roof systems to transfer heat from the heat absorbing materials to fluid flowing through the lines. The heat fluid can then be used to heat a portable water supply, preheat fluid for industrial applications, heat a building, heat a swimming pool, generate electricity, etc. Although such heat accumulating systems are becoming more common, such systems are generally unsightly, difficult, and time consuming to install due to the materials needed to be connected to a roofing system and the housing that is required. Further, the solar thermal energy collectors most commonly require attachment of hardware onto or penetrating through the roofing system, thus introducing the risk of a failed roof system and may nullify the roofing system warranty.

Metal roof systems are commonly installed on commercial and government buildings. As commercial and government organizations have continued to push for alternative energy sources, the demand to install energy efficient and energy collecting roof systems has increased. As such, the demand has continued to rapidly increase for metal roof systems on commercial and government buildings that can be used to collect energy.

In view of the current state of the art of anchoring clips, there is a continuing need for an anchoring system that is simple and easy to use, has improved wind up-lift resistance and can optionally be used with heat accumulating roof systems.

SUMMARY OF THE INVENTION

The present invention is directed to an improved anchoring system, and more particularly to an improved roofing panel system that includes the use of an improved anchoring system that has improved wind uplift resistance for siding and/or roofing panels. The roofing system of the present invention includes a plurality of roofing and/or siding panels and a novel anchoring system that includes an improved anchoring clip and/or an improved cap member. The anchoring system can also optionally include a secondary sealing system. Each of the roofing and/or siding panels generally include at least one side flange. When the roofing and/or siding panels include two side flanges, the roofing and/or siding panels has a generally U-shaped profile; however, this is not required. An upper end of each side flange may be pre-bent to at least partially conform to a profile of a portion of an anchoring clip; however, this is not required. When one or more portions of a side flange are pre-bent, such pre-bending facilitates in the positioning of the roofing and/or siding panels relative to the anchoring clip when installing the roofing and/or siding panels on a building or other type of structure. The improved anchoring clip of the present invention includes at least one base flange and a top flange portion. The one or more base flanges and the top flange portion are positioned along a vertical wall member of the anchoring clip. The vertical wall member can be formed of one or more pieces. When the vertical wall member is formed of more than one piece, generally two base flanges are used; however, this is not required. The vertical wall member can be generally planar along its length; however, this is not required. The vertical wall can be connected to one or more base flanges and/or top flanges of the top flange portion at a perpendicular angle or a non-perpendicular angle. The top flange portion is generally positioned at some distance vertically above the one or more base flanges when the base flange is secured to the roof substrate. The top flange portion includes one or more top flanges. The one or more top flanges are adapted to engage with a top portion of a side flange of a roofing and/or siding panel. The two top flanges are generally oriented in the same plane and are spaced equal distances above the one or more base flanges; however, this is not required. At least one base flange is adapted to fasten the anchoring clip to the substructure of a roof system. Each of the cap members is designed to facilitate in securing the side flange of a roofing and/or siding panel to an anchoring clip. Each of the cap members typically include side walls that facilitate in retaining a side flange of the roofing and/or siding panel on the top flange and/or vertical wall member of the anchoring clip. This connection arrangement for the roofing and/or siding panels results in no direct fastening of the roofing and/or siding panels to the substructure of a roof system so that relative movement of one or more of the roofing and/or siding panels is permitted. The top flange portion of the anchoring clip is designed to at least partially bear the weight of the roofing and/or siding panels.

In one non-limiting embodiment of the invention, the top flange portion of the anchoring clip can be optionally detachably connected to the vertical wall member of the anchoring clip. In such a non-limiting arrangement, the anchoring clip is one non-limiting type of multi-piece system. In such an arrangement, the one or more base flanges can be connected to the roof substrate prior to the top flange portion being connected to the top portion of the vertical wall member of the anchoring clip. As can be appreciated, many different connection arrangements can be used to connect the top flange portion to the top portion of the vertical wall member of the anchoring clip (e.g., adhesive, solder, weld, tongue and groove configuration, threaded connection, rivet, screw, clip, snap-lock configuration, etc.). In one non-limiting aspect of the invention, the top portion of the vertical wall member of the anchoring clip includes one or more grooves or slots. The base portion of the top flange portion can include a cavity which includes one or more grooves slots that are designed to mate with the one or more grooves or slots in the top portion of the vertical wall member so that the top flange portion can be connected to the wall member. As can be appreciated the slot and cavity arrangement described above can be reversed. In one non-limiting configuration, the one or more groove or slots in the cavity of the top flange portion and the one or more grooves or slots on the top portion of the vertical wall member are designed so that the top flange portion can be slid onto the top portion of the vertical wall member. In such an arrangement, the top flange portion can be connected to the vertical wall member after the one or more base flanges are connected to the roof substrate. In another non-limiting configuration, the width of the vertical wall member can be the same as, greater than or less than the longitudinal length of the top flange portion. When the width of the vertical wall member is less than the longitudinal length of the top flange portion, the top flange portion can be designed to span between two vertical wall members that are spaced apart from one another. Such an arrangement can be used to save on material cost without substantially sacrificing the structural integrity and strength of the anchoring clip.

In another and/or alternative non-limiting embodiment of the invention, the top flange portion of the anchoring clip includes a pair of flanges. The orientation of the flanges to one another is non-limiting. In one non-limiting arrangement, the two flanges extend vertically upward from the vertical wall member of the anchoring clip. In one non-limiting configuration, the two flanges extend vertically upward from the vertical wall member in a plane that is generally parallel to the vertical wall member, are spaced apart from one another, and are generally parallel to one another. Such a configuration creates a generally U-shaped profile. Such a U-shaped profile forms a cavity between the two flanges. The spacing between the flanges can be constant or vary along the length of the flanges. The height of the flanges is non-limiting. Generally, the shape, thickness and height of the two flanges are the same; however, this is not required. As can be appreciated, other configurations and profiles of the two flanges can be used on the anchoring clip (e.g., one or more of the flanges extend laterally outwardly so as to lie in a non-parallel plane to the wall member, one or more of the flanges extend laterally outwardly so as to lie in a non-parallel plane to the wall member and non-parallel to one another, etc.). The top flange portion can be formed of one or more pieces. The top flange portion can be integrally formed with the vertical wall member of the anchoring clip, or be separable from the vertical wall member.

In still another and/or alternative non-limiting embodiment of the invention, the anchoring clip includes one or more base flanges, a vertical wall member and a top flange portion. The anchoring clip can be formed of one or more materials (e.g., metal, plastic, composite materials, wood, ceramic, etc.). In one non-limiting aspect of the invention, the anchoring clip includes a single base flange however, it can be appreciated that the anchoring clip can include two base flanges extending laterally from the bottom portion of the vertical wall member. The one or more base flanges are designed to be connected to a roof substrate in a variety of ways (e.g., nail, screw, rivet, adhesive, bolt and nut, etc.). The length, thickness and shape of the one or more base flanges is non-limiting. The one or more base flanges are designed to be connected generally perpendicular to the vertical wall member; however, this is not required. The one or more base flanges can include one or more openings to facilitate in the connection of the one or more base flanges to the roof substrate; however, this is not required. As can be appreciated, the term roof substrate is not limited to the structural framing of a roof (e.g., roof frame, beams, etc.), but includes any structure on the roof to which the base flange of the anchoring clip can be connected (e.g., pre-existing roof surface, wood decking, rigid board insulation, metal decking, etc.). The length, thickness and shape of the vertical wall member is non-limiting. The vertical wall member can be formed of one or more pieces. The vertical wall member can be integrally formed with the one or more base flanges and/or top flange portion, or be separable from the one or more base flanges and/or top flange portion. The top flange portion can be formed of one or more pieces. In one non-limiting configuration, the one or more base flanges and vertical wall member of the anchoring clip are a single extruded component and the top flange portion is separate another extruded component. In another non-limiting configuration, the one or more base flanges, vertical wall member, and top flange portion of the anchoring clip are a single extruded component. As can be appreciated, one or more portions of the anchoring clip can be formed by a process other than an extrusion process (e.g., casting, cutting, stamping, roll forming, cold bending, etc.). In another non-limiting configuration, the anchoring clip can be a multi-piece clip wherein the top flange, vertical wall member and/or base flanges are divided down the vertical middle of the anchoring clip. In one arrangement, the anchoring clip is formed of two halves that are connected together when the roof system is installed on a roof substrate.

In yet another and/or alternative non-limiting embodiment of the invention, the anchoring clip can optionally include one or more shelf flanges extending at least partially outwardly from one or both sides of the vertical wall member. The one or more shelf flanges can be connected to, be in contact with, or be spaced form the vertical wall member. When one or more of the shelf flanges are spaced from the vertical wall member, such shelf flanges are generally connected to one or more of the base flanges; however, this is not required. In one non-limiting configuration, the one or more shelf flanges lie in a plane that is generally perpendicular to the vertical wall member; however, this is not required. When two or more shelf flanges are used, the shelf members generally lie in the same parallel plane and/or are positioned at the same height location along the length of the vertical wall member; however, this is not required. The shape, thickness and length of the one or more shelf flanges are not limiting. In one non-limiting configuration, the shape, thickness and length of the shelf flanges are the same; however, this is not required. The one or more shelf flanges, when used, are positioned below the top flange portion and above the one or more base flanges of the anchoring clip. The one or more shelf flanges are designed to at least partially bear the weight of roof panels when the roofing and/or siding panels are deflected; however it will be appreciated that the one or more shelf flanges can also or alternatively act to limit deflection of the roofing and/or siding panels.

In still yet another and/or alternative non-limiting embodiment of the invention, the cap member or batten cap is designed to facilitate in maintaining and/or connecting a roofing and/or siding panel to the anchoring clip. The cap member can be designed to maintain and/or connect a roofing and/or siding panel to the top flange portion and/or vertical wall member of the anchoring clip. The cap member is also or alternatively used to form a weather proof seal (e.g., water proof, etc.) between the two adjacent positioned roof panel flanges and the anchoring clip. One or more sealants can optionally be used to partially or fully form the weather proof seal. Generally, the cap member is used to facilitate in maintaining and/or connecting two side flanges of two roofing and/or siding panel to the anchoring clip wherein one side flange of a first roofing and/or siding panel is positioned on one side of the anchoring clip and another side flange of a second roofing and/or siding panel that is positioned on the other side of the anchoring clip. The cap member generally includes a top portion and two legs that extend downwardly from the top portion. The top portion and legs have an inside surface that can form an inside cavity of the cap member. The cap member is generally a single piece component; however, this is not required. The cap member can be an extruded component; however, it can be appreciated that the cap member can be formed by processes other than an extrusion process (e.g., stamping, cutting, casting, molding, roll forming, etc.). The cap member can be formed of one or more materials (e.g., metal, plastic, composite materials, wood, ceramic, etc.). The cap member can include an indented portion at or near the bottom portion on one or both legs; however, this is not required. The one or more indented portions, when used, are designed to 1) facilitate in securing the cap member to the top flange portion of the anchoring clip when the roof panels are positioned on the top flange portion, 2) facilitate in the removal of the cap member from the top flange portion of the anchoring clip, and/or 3) facilitate in the water tight sealing of one or more roofing and/or siding panels to the anchoring clip. As can be appreciated, the indented portion can have other or additional functions. The configuration of the indented portions is non-limiting. One or more bonding arrangements (e.g., adhesive, weld, solder, melted connection, rivet, screw, bolt, staple, etc.) and/or sealing arrangements (e.g., sealing ring, sealing compound, etc.) can be used with the cap member to 1) facilitate in securing the cap member to the top flange portion of the anchoring clip when the roof panels are positioned on the top flange portion and/or 2) facilitate in the water tight sealing of one or more roofing and/or siding panels to the anchoring clip. As can be appreciated, the bonding arrangement can also function as a sealing arrangement; however, this is not required. In one non-limiting configuration, one or more inside surfaces of the legs and/or top portion of the cap member includes a bonding and/or sealing arrangement. For instance a rubber or plastic sealing ring or strip can be positioned on one or more inside surfaces of one or more of the legs and/or top portion of the cap member. Alternatively or additionally, a liquid or semi-liquid sealant/bonding agent can be positioned i) on one or more inside surfaces of one or ore of the legs and/or top portion of the cap member, ii) at the end of one or more of the legs of the cap member, and/or iii) on the outer surface of one or more of the legs at or near the bottom portion of the one or more legs of the cap member. In one non-limiting arrangement, one or more sealing and/or bonding arrangements are pre-applied in the cavity of the cap member prior to the cap member being connected to the anchoring clip; however, this is not required. In another non-limiting arrangement, one or more sealing and/or bonding arrangements are applied to the cap member after the cap member is at least partially connected to the anchoring clip; however, this is not required. In still another non-limiting arrangement, one or more sealing and/or bonding arrangements are pre-applied in the cavity of the cap member prior to the cap member being connected to the anchoring clip and one or more sealing and/or bonding arrangements are applied to the cap member after the cap member is at least partially connected to the anchoring clip; however, this is not required. As can be appreciated, one or more sealing and/or bonding arrangements can be applied to the region of the roof panels that overly at least a portion of the top flange portion of the anchoring clip prior to connecting the cap member to the anchoring clip; however, this is not required.

In still yet another and/or alternative non-limiting embodiment of the invention, the cap member or batten cap can be designed to allow the flow of fluid (e.g., liquid, gas, etc.) on and/or through the cap member. In many regions, roof systems are used to collect energy so as to use such energy to heat/cool a building or other type of structure and/or to generate electricity. The fluid channel in the cap member can be used to collect energy by enabling fluid to flow through the fluid channel and be heated by the sun and/or ambient temperatures. The heated fluid can then be transported to an energy collection system that is well known in the art to use the heated fluid to heat/cool a building or other type of structure and/or to generate electricity (e.g., heat exchanger, pool heater, heat pump for heating/cooling a building, etc.). In prior art roofing systems of this type, fluid tubes needed to be inserted on the surface and/or under the roofing panels so as to convey the heated fluid from the roof system to a desired location. The use and installation of such tubing was difficult to install, time consuming to install, and undesirable to look at. The cap members of the present invention are designed to overcome all of these past problems. In one non-limiting embodiment of the invention, the cap member is designed to enable fluid to flow 1) above the top portion of the cap member, 2) in a cap member channel located on top of the top portion of the cap member, 3) in a cap member channel located below the top portion of the cap member, 4) in a channel that is formed between at least a portion of the inside surface of the cap member and at least a portion of the anchoring clip and/or roofing and/or siding panels, 5) through a fluid tube or conduit that can be connected to the bottom surface cap member, and/or 6) through a fluid tube or conduit that can be connected to the top surface of the cap member. Arrangements 2-5 are designed to hide from view the tubing and/or conduit used to convey the heated fluid. Arrangements 1 and 6 are designed to form or secure tubing and/or conduit in an orderly and simple arrangement to the top surface of the cap ember. As can be appreciated, many different configurations of the cap member can be used to accomplish arrangements 1-6 set forth above. In one non-limiting configuration, the cap member includes a fluid channel that is fully or partially positioned in the cavity of the cap member. The fluid channel can be formed anywhere in the cavity of the cap member. In one non-limiting arrangement, the fluid channel is at least partially formed by the inner surface of one or more of the cap member legs and/or by the inner surface of the top portion of the cap member. The size and/or shape of the fluid channel is non-limiting. The cross-sectional size and/or shape of the fluid channel can be constant or vary along the length of the channel. The fluid channel generally has an opening at both ends of the cap member; however, this is not required. The fluid channel can include one or more access openings between the two ends of the cap member; however, this is not required. The fluid channel can include an adapter arrangement that is designed to be inserted into or receive a complementary adapter arrangement on an adjacently positioned cap member and/or to a fluid tube and/or fluid conduit; however, this is not required. Such an adapter arrangement, when used, can facilitate in fluidly connecting together adjacently positioned cap members and/or connecting the fluid channel in the cap member to other tubing and/or fluid conduit. In another non-limiting arrangement, the fluid channel is spaced from the inner surface of one or more of the cap member legs and/or from the inner surface of the top portion of the cap member. In such an arrangement, the cavity of the cap member can include a clip or other type of connection arrangement (e.g., clasp, adhesive, solder, weld, clamp, etc.) used to connect a tube or other type of fluid conduit at least partially in the cavity of the cap member. Alternatively, a fluid channel can be at least partially formed in the cavity wherein the fluid channel is spaced from the inner surface of one or more of the cap member legs and/or from the inner surface of the top portion of the cap member by one or more legs. The size and/or shape of the fluid channel is non-limiting. The cross-sectional size and/or shape of the fluid channel can be constant or vary along the length of the channel. The fluid channel generally has an opening at both ends of the cap member; however, this is not required. The fluid channel can include one or more access openings between the two ends of the cap member; however, this is not required. The fluid channel can include an adapter arrangement that is designed to be inserted into or receive a complementary adapter arrangement on an adjacently positioned cap member and/or to a fluid tube and/or fluid conduit; however, this is not required. Such an adapter arrangement, when used, can facilitate in fluidly connecting together adjacently positioned cap members and/or connecting the fluid channel in the cap member to other tubing and/or fluid conduit. In another non-limiting configuration, the cap member includes a fluid channel that is positioned outside the cavity of the cap member. The fluid channel can be formed anywhere outside of the cavity of the cap member. For example, the fluid channel can be positioned on the outside surface of one or more of the cap member legs and/or on the outer surface of the top portion of the cap member. In one non-limiting arrangement, the fluid channel is at least partially formed by the outside surface of one or more of the cap member legs and/or by the outside surface of the top portion of the cap member. The size and/or shape of the fluid channel is non-limiting. The cross-sectional size and/or shape of the fluid channel can be constant or vary along the length of the channel. The fluid channel generally has an opening at both ends of the cap member; however, this is not required. The fluid channel can include one or more access openings between the two ends of the cap member; however, this is not required. The fluid channel can include an adapter arrangement that is designed to be inserted into or receive a complementary adapter arrangement on an adjacently positioned cap member and/or to a fluid tube and/or fluid conduit; however, this is not required. Such an adapter arrangement, when used, can facilitate in fluidly connecting together adjacently positioned cap members and/or connecting the fluid channel in the cap member to other tubing and/or fluid conduit. In another non-limiting arrangement, the fluid channel is spaced from the outside surface of one or more of the cap member legs and/or from the outside surface of the top portion of the cap member. In such an arrangement, the cavity of the cap member can include a clip or other type of connection arrangement (e.g., clasp, adhesive, solder, weld, clamp, etc.) used to connect a tube or other type of fluid conduit at least partially to the outside surface of the cap member. Alternatively, a fluid channel can be at least partially spaced from the outside surface of one or more of the cap member legs and/or from the outside surface of the top portion of the cap member by one or more legs. The size and/or shape of the fluid channel is non-limiting. The cross-sectional size and/or shape of the fluid channel can be constant or vary along the length of the channel. The fluid channel generally has an opening at both ends of the cap member; however, this is not required. The fluid channel can include one or more access openings between the two ends of the cap member; however, this is not required. The fluid channel can include an adapter arrangement that is designed to be inserted into or receive a complementary adapter arrangement on an adjacently positioned cap member and/or to a fluid tube and/or fluid conduit; however, this is not required. Such an adapter arrangement, when used, can facilitate in fluidly connecting together adjacently positioned cap members and/or connecting the fluid channel in the cap member to other tubing and/or fluid conduit. As can be appreciated, the cap member can include and/or form more than one fluid channel. For example, one or more fluid channels can be included on the outside surface of the cap member and/or within the cavity of the cap member. The fluid that flows through the one or more fluid channels can be pumped, flow by gravity and/or thermally siphoned.

In another and/or alternative non-limiting embodiment of the invention, the roofing and/or siding panels and/or the cap member can include a color and/or coating which facilitates in the collection of heat on the roof system. For example, the cap member and/or roofing and/or siding panel can be dark colored so as to absorb heat for sunlight and heat up the cap member and/or roofing and/or siding panel. The heated cap member and/or roofing and/or siding panel can then transfer heat to the fluid flowing through one or more fluid channels on the outside surface of the cap member and/or within the cavity of the cap member; however, this is not required. As can be appreciated, the color of the can be a light color for the roofing and/or siding panels and/or the cap member. In another non-limiting example, the top surface of the roofing and/or siding panels can include a reflective coating to maintain a relatively cool temperature of the roofing/siding system, and the cap member can be colored and/or coated with a material that absorbs radiation so as to facilitate in the heating of the fluid flowing through one or more of the fluid channels; however, this is not required.

In still another and/or alternative non-limiting embodiment of the invention, a locking crown is provided to facilitate in securing the roofing and/or siding panels to the anchoring clip. The locking crown can be designed to extend along the full length of the anchoring clip and/or roof panel or only along a portion of the length of the anchoring clip and/or roof panel. The locking crown includes a body portion, at least one leg, and optionally an intermediate extender. The one or more legs of the locking crown are generally positioned at or close to a side edge of the body portion. In one non-limiting configuration, the locking crown is provided with two legs positioned at or near the two sides of the locking crown. At least a portion of the legs extend downwardly from the body portion. When the locking crown includes two legs, the legs can have the same or different shape, length, and/or thickness. In addition, when the locking crown includes two legs, the legs, along one or more portions of the length of the legs can be spaced equally apart, slope toward one another, or slope away from one another. The one or more legs are designed to at least partially retain and/or clamp a portion of the side flange of the roofing and/or siding panel between the one or more legs and the top flange portion of the anchoring clip when the locking crown is inserted onto the top flange portion of the anchoring clip. The intermediate extender, when used, is generally positioned between the two sides of the body portion of the locking crown. The intermediate portion extends downwardly from the bottom surface of the body portion. The intermediate portion is designed to be at least partially inserted between the two flanges of the top flange portion of the anchoring clip when the locking crown is placed on the top flange portion of the anchoring clip. In one non-limiting arrangement, the intermediate extender is designed to at least partially bend an end portion of the side flange of a roofing and/or siding panel into the region between the two flanges of the top flange portion of the anchoring clip as the locking crown is inserted onto the top flange portion of the anchoring clip; however, this is not required. The end portion of the intermediate extender of the locking crown can include one or more sloped surfaces to facilitate in the bending of the end portion of the side flange; however, this is not required. In one non-limiting configuration, the end portion of the intermediate extender includes two sloped surfaces so as to facilitate in the bending of two end portions of two side flanges of a roofing and/or siding panel that are positioned on both sides of the anchoring clip. In such a configuration, the end portion can be shaped similar to an arrow; however, the end portion can have other configurations. The end portion of the intermediate extender can also be sized and shaped such that once the end portion is inserted into the top flange portion of the anchoring clip, the end portion causes the end portion of at least one of the side flanges of the roofing and/or siding flanges to bend at least partially into the space between the two flanges of the top flange portion and also cause the end portion to be at least partially locked into the region between the two flanges. Such an arrangement results in one or both side flanges of the roofing and/or siding panels and the locking crown being secured to the anchoring clip. The end portion of the intermediate extender and the spacing between the two flanges on the top flange portion of the anchoring clip can be selected such that the end portion of the intermediate extender can be properly inserted between the two flanges when the locking crown is inserted on the anchoring clip. In one non-limiting arrangement, the difference between the spacing between the two flanges of the top flange portion of the anchoring clip and the widest portion of the end portion of the intermediate extender that is positioned between the two flanges of the top flange portion is equal to or greater than two times the thickness of the end portion of the side flanges of the roofing and/or siding panels that are positioned on or adjacent to the anchoring clip. Such a spacing allow the end portion of the intermediate extender to be inserted between the two flanges and also to clamp the end portions of the side flanges of the roofing and/or siding panels between the end portion of the intermediate extender and the two flanges of the top flange portion of the anchoring clip. In one non-limiting arrangement, the difference between the spacing between the two flanges of the top flange portion of the anchoring clip and the widest portion of the end portion of the intermediate extender that is positioned between the two flanges of the top flange portion is about 2.1-30 times the thickness of the end portion of the side flanges of the roofing and/or siding panels that are positioned on or adjacent to the anchoring clip. In another non-limiting arrangement, the difference between the spacing between the two flanges of the top flange portion of the anchoring clip and the widest portion of the end portion of the intermediate extender that is positioned between the two flanges of the top flange portion is about 3-20 times the thickness of the end portion of the side flanges of the roofing and/or siding panels that are positioned on or adjacent to the anchoring clip. In still another non-limiting arrangement, the difference between the spacing between the two flanges of the top flange portion of the anchoring clip and the widest portion of the end portion of the intermediate extender that is positioned between the two flanges of the top flange portion is about 3-10 times the thickness of the end portion of the side flanges of the roofing and/or siding panels that are positioned on or adjacent to the anchoring clip. The intermediate extender can include one or more teeth and/or gripping arrangements that can be used to maintain the locking crown in position on the anchoring clip and/or side flanges. Such teeth and/or gripping arrangements can be designed to engage one or more portions of the side flanges a) after the intermediate extender has been inserted between the side flanges and/or b) when the locking crown moves to disengage from the anchoring clip and/or side flanges. During high wind conditions, the roof panel may tend to be uplifted off of the roof substrate. When such an action occurs, the side panels may attempt to raise upwardly and attempt to push the locking crown upwardly. The intermediate extender can be designed to inhibit or prevent any or excessive upward movement of the locking crown, thereby facilitating in maintaining the roof panels on a roof substrate. Such resistance to wind uplift can be accomplished on flat and/or sloped roof surfaces.

In yet another and/or alternative non-limiting embodiment of the invention, the locking crown can optionally a) include one or more fluid channels, b) have one or more fluid tubes or fluid conduits connected to the locking crown, c) and/or the locking crown can be used in conjunction with the cap member, anchoring clip, sealing and/or bonding agents, and/or one or more roofing and/or siding panels to form one or more fluid channels. The function and use of the one or more fluid channels is generally the same as the one or more fluid channels that are connected to and/or partially or fully formed by the cap member as discussed above. The size and/or shape of the one or more fluid channels is non-limiting. The locking crown can include one or more adapter arrangements that are designed to fluidly connect together adjacently positioned locking crowns; however, this is not required. The configuration of the adapter arrangements, when used, are generally the same as the adapter arrangements that can optionally be used with the cap members, as discussed above. The size and configuration of the adapter arrangements, when used, are non-limiting.

The anchoring clip of the present invention has several advantages over prior art anchoring clips. One non-limiting advantage of the anchoring clip is that by utilizing an anchoring clip formed of two of more components, such that one section (e.g., the top flange portion, etc.) can slide into and interlock with another section (e.g., the vertical wall member, etc.), the design of a roof system for wind uplift resistance may be optimized beyond the means currently available. One limitation of the anchoring clip illustrated in the '045 patent is that the improved wind uplift resistance is achieved by creating a continuous anchoring clip over the full cross section when continuous anchoring of only a portion of the cross section may be necessary. This limitation of the anchoring clip can render the use of such anchoring clip non-cost effective. Currently, individual and discreet anchoring clips must be placed at locations at which there is a supporting deck or sub frame (for instance every 60 inches on center). When such roofing sub framing members are not provided in a pattern as required for the roofing system (for instance the roofing panel may require attachments every 43 inches on center), a continuous extruded full cross section member may be provided by the anchoring clip illustrated in the '045 patent. The anchoring clip of the present invention allows for a partial cross-section of the anchoring clip (the base flange and wall member of the anchoring clip) to be utilized in a continuous fashion to span the roof sub-framing supports, while the top flange portion of the anchoring clip can be utilized in discreet segmented lengths (e.g., located every 43 inches on center immediately above the continuous base portion, etc.). The anchoring clip of the present invention thus allows for a more economical means of providing an ideal and project-specific wind uplift resistance.

The configuration of the anchoring clip of the '045 patent requires that the anchoring clip be used as a continuous anchoring clip of a full cross sectional area as a means to provide improved wind uplift resistance as compared to discreet individual and segmented anchor clips. The anchoring clip of the present invention, when formed of two or more components, can allow for a continuous top flange portion to continuously engage the roofing panel flanges, while only discreet segmented lengths of the wall member and base flange of the anchoring clip can be used to provide a suitable attachment to the roof sub-framing or decking elements. Such an advantage conserves material cost thereby making the anchoring clip of the present invention more economical to use.

The roofing and/or siding system of the present invention can include the use of a locking crown that can be used to facilitate in securing one or more of the roofing and/or siding panels to the anchoring clip, thereby enhancing the wind uplift resistance of the roofing and/or siding panels. The locking crown can also be used to improve the rigidity and strength of the roofing and/or siding system.

The anchoring clip in combination with a cap member and/or locking crown of the present invention can be used to facilitate in the integration of an active solar thermal energy collection system on a roof system. A modified cap member and/or locking crown can be used to allow for fluid flow in and/or on cap member and/or locking crown so as to collect energy for use in an active solar thermal energy collection system. The improved cap member and/or locking crown can be formed from traditional means (e.g., a sheet metal cold formed shape of uniform thickness, etc.), or a specialized extruded shape, or a combination of both. The improved cap member and/or locking crown can have a "closed" cross section—that is a cross section that cannot be formed from bending a sheet of uniform thickness metal. Such an improved cap member and/or locking crown can include an internal chamber along the full length of the cap member and/or locking crown; however, this is not required. When the improved cap member and/or locking crown is an extruded component, the internal chamber can be configured to share a portion of metal that is exposed to the exterior environment, thus would be contiguous with the remainder of the cap member and/or locking crown, however, this is not required. By passing a fluid through one or more fluid channels in and/or the cap member and/or locking crown, the heat energy of the sun can be conducted through the cap member and/or locking crown and be absorbed by/transferred into the fluid flow in the one or more fluid channels. As can be appreciated, heat in the fluid can be transferred to the cap member and/or locking crown and then to the roof panels and/or ambient environment. The heated fluid can be circulated back to a collector pipe and pumped through a traditional heat exchanger which can be used to heat potable water used by the occupants of the building and/or be used for some other or additional reason (e.g., heat pump to heat or cool a home, heating a pool, etc.). This method of solar thermal energy collection is novel and advantageous because it is aesthetically unobtrusive to the building exterior—the "collector plates" and "fluid tubes" of traditional solar thermal energy collection systems are better organized and/or hidden by the cap member and/or locking crown; however, the use of the cap members and/or locking crowns of the present invention cause little or no visible variation to the appearance of the standing seam roof whereas the "collector plates" and "fluid tubes" of traditional solar thermal energy collection systems impair the look of a roof system. The integrated solar thermal energy collector created by the cap member and/or locking crown of the present invention has an additional advantage in that the cap member and/or locking crown adds very little extra weight to the roof surface as compared to "collector plates" and "fluid tubes" of traditional solar thermal energy collection systems. The integrated solar thermal energy collector created by the cap member and/or locking crown of the present invention does not alter the building's seismic response frequency, nor requires any structural upgrades, as compared to other stand alone rooftop mounted dedicated solar thermal collector panels. The integrated solar thermal energy collector created by the cap member and/or locking crown of the present invention can be used to retrofit roof systems without having to fully remove previously installed paneled roof systems. The integrated solar the al energy collector created by the cap member and/or locking crown of the present invention does not impair the roof system performance, and can enhance the roof system performance. The integrated solar thermal energy collector created by the cap member and/or locking crown of the present invention can be later activated without significant modifications to the roof system.

The roofing and/or siding system of the present invention can include the use of an active selective coating system for the roofing and/or siding system; however, this is not required. Coatings currently used for roof systems are designed as "cool colors"—the pigments are specifically selected and formulated to reflect up to about 50%, typically up to about 60%, more typically up to about 70%, even more typically up to about 80%, and still even more typically up to about 90% of all solar heat gain back into the atmosphere. This is generally beneficial as it greatly reduces the energy requirements for the building. Universal use of cool color roof coatings are a detriment to the efficiency of active solar thermal collector systems since the solar thermal collection devices are most effective when absorbing the maximum heat from the sun. The "active selective" coating system of the present invention can be designed to use "cool color" pigments on the exposed roof panel elements to reflect a significant amount of heat gain away from the main roof surface area while using "warm color" pigments on the cap members so the cap members can absorb a majority of the heat energy directed onto the cap members; however, this is not required. For example, the "warm color" pigments on the cap members, when used, can be designed to readily absorb certain types of radiation (e.g., IR radiation, etc.); however, this is not required. Because pigments selectively reflect or absorb light from primarily the non-visible infra-red spectrum, the "warm color" pigments that are used on the cap members can be selected so that there is no noticeable difference in the visible color of the cap members and the roofing and/or siding panels. For example, the roofing and/or siding panels can have a white pigment that reflects a large portion of the radiation so as to form a "cool roof" and the cap members can include a white pigment that absorbs certain types of radiation so that the fluid passing on and/or through the cap member is heated by the absorbed radiation. However, since the pigments of the roofing and/or siding panels and the cap members are both white, the color of the roofing and/or siding panels and the cap members to the human eye would be the same or very similar, thus, preserving the aesthetics of the roofing and/or siding system.

The anchoring clip of the present invention may be utilized to construct the roofing and/or siding system in a sequence that is not currently possible, which can further improve the wind uplift resistance of the roofing and/or siding system. Currently, roofing and/or siding panels are installed in a sequence limited to: 1) placing a first roofing and/or siding panel with side flange on the roof or siding, 2) installing the anchoring clip to the roof or siding substrate, 3) engaging the anchoring clip with the side flange of the first roofing and/or siding panel, 4) install second panel with a side flange on the roof or siding, 5) engaging the anchoring clip with the side flange of the second roofing and/or siding panel, and 6) placing the cap member over the two flange portions to secure the two roofing and/or siding panels to the anchoring clip. The anchoring clip of the present invention allows for a new installation sequence which will make possible a new and improved means for engaging the flanges of the two adjacent roofing and/or siding panels to the anchoring clip of the present invention. One non-limiting new method is as follows: 1) placing the first panel on the roof or side of a building or other type of structure, 2) installing the base portion of the anchoring clip to the roof or siding substrate of a building or other type of structure such that the side flange of the first panel engages or is positioned closely adjacent to the vertical wall member of the anchoring clip, 3) installing the second panel with its side flange engaging or positioned closely adjacent to the vertical wall member of the anchoring clip, 4) install the top flange portion of the anchoring clip on the top portion of the vertical wall member by sliding the top flange portion onto the top portion of the vertical wall member so that the top flange portion engages the groove in the side flanges of the two roof panels, and 5) placing the cap member over the two flange portions to secure the roof panels to the anchoring clip of the present invention. Another non-limiting new method is as follows: 1) placing the first panel on the roof or side of a building or other type of structure, 2) installing the base portion of the anchoring clip to the roof or siding substrate of a building or other type of structure such that the side flange of the first panel engages or is positioned closely adjacent to the vertical wall member of the anchoring clip, 3) installing the second panel with its side flange engaging or positioned closely adjacent to the vertical wall member of the anchoring clip, 4) install the locking crown on the top flange portion of the anchoring clip so as to cause a portion of the end of the side flanges of the two roofing and/or siding panels to bend toward and/or into a space between the two flanges of the top flange portion of the anchoring clip, and 5) placing the cap member over the two flange portions and the locking crown so as to secure the roof panels to the anchoring clip of the present invention. Still another non-limiting new method is as follows: 1) placing the first panel on the roof or side of a building or other type of structure, 2) installing the base portion of the anchoring clip to the roof or siding substrate of a building or other type of structure such that the side flange of the first panel engages or is positioned closely adjacent to the vertical wall member of the anchoring clip, 3) installing the second panel with its side flange engaging or positioned closely adjacent to the vertical wall member of the anchoring clip, 4) install the locking crown on the top flange portion of the anchoring clip so as to cause a portion of the end of the side flanges of the two roofing and/or siding panels to bend toward and/or into a space between the two flanges of the top flange portion of the anchoring clip and thereby cause an end portion of an intermediate extender of the locking crown to be locked in the space between the two flanges of the top flange portion by one or both of the bent ends of the side flanges, and 5) placing the cap member over the to flange portions and the locking crown so as to secure the roof panels to the anchoring clip of the present invention. As can be appreciated for each of the new methods set forth above, the anchoring clip can be secured to the roof and/or siding substrate prior to placing the first panel on the roof and/or side of a building or other type of structure. As can also be appreciated, the cap member and/or locking crown can include and/or form one or more fluid channels, and/or one or more fluid tubes or fluid conduits can be connected to the cap member and/or locking crown. The locking crown can be used to improve the roof system strength by retaining in place the panel top flanges, thereby limiting the lateral spread of the panel vertical elements, resulting in impeding a very common failure mode, namely (when experiencing wind uplift conditions) the roof panel top flanges slipping off of the top flange elements of the anchoring clip.

In one non-limiting arrangement of the invention in accordance with the present invention, there is provided a system for connecting roof or siding panels to a substructure that includes a) first and second panels, wherein each of the panels has a channel section and a pair of opposed side flanges; b) an anchoring clip system that includes an anchoring clip and a side flange securing arrangement, and wherein the anchoring clip has a base flange, a vertical wall member and a top flange portion, and wherein the base flange is adapted to be connected to a substructure, and wherein the vertical wall member is connected between the base flange and the top flange portion, and wherein the top flange portion includes two flanges that are spaced from one another, and wherein the flange securing arrangement is designed to secure the side flanges of the first and second panels to the to flame portion of the anchoring clip and wherein the side flange securing arrangement includes a locking crown and/or a cap member; and, c) a fluid channel designed to enable fluid to controllably flow through the anchoring clip arrangement, and wherein the fluid channel inhibits or prevents fluid flow between the side flanges and to the substructure, and wherein said fluid channel is at least partially secured to, or at least partially formed by the cap member. The fluid channel arrangement optionally includes a) a fluid channel that is at least partially formed on a top surface of the top portion of the cap member and extends a majority of a longitudinal length of the top portion, b) a fluid channel that is at least partially formed on a bottom surface of the top portion of the cap member and is at least partially positioned between the two side legs, and wherein the fluid channel extends a majority of a longitudinal length of the top portion, c) a fluid channel that is at least partially positioned in a cavity of the cap member, and wherein the cavity is formed by a bottom surface of the top portion and an inner surface of the two side legs, and wherein the fluid channel extends a majority of a longitudinal length of the top portion, d) a fluid tube that is connected to a fluid tube connector that is at least partially positioned on a top surface of the top portion of the cap member, or e) a fluid tube that is connected to a fluid tube connector that is at least partially positioned in a cavity of the cap member, and wherein the cavity is formed by a bottom surface of the top portion and an inner surface of the two side legs. The system can optionally include a locking crown and a cap member, and wherein the locking crown includes a main body and two side legs extending downwardly from said the body, and wherein the locking crown is designed to sandwich a portion of the side flanges of the first and second panels between the two side legs and the outer surface of the top flange portion of the anchoring clip when the locking crown is positioned about at least a portion of the anchoring clip, and wherein the cap member includes a top portion and two side legs extending downwardly from the top portion, and wherein the cap member is designed to be positioned about at least a portion of the locking crown and about at least a portion of the side flanges of the first and second panels when the cap member is positioned about at least a portion of the anchoring clip so as to facilitate in maintaining the locking crown and the side flanges in position relative to the anchoring clip. The system can optionally include a locking crown and a cap member, wherein the locking crown includes a main body and two side legs extending downwardly from the main body, and wherein the locking crown is designed to sandwich a portion of the side flanges of the first and second panels between the two side legs and the outer surface of the top flange portion of the anchoring clip when the locking crown is positioned about at least a portion of the anchoring clip, and wherein the cap member includes a top portion and two side legs extending downwardly from the top portion, and wherein the cap member is designed to be positioned about at least a portion of the locking crown and about at least a portion of the side flanges of the first and second panels when the cap member is positioned about at least a portion of the anchoring clip so as to facilitate in maintaining the locking crown and side flanges in position relative to the anchoring clip. The locking crown optionally includes an intermediate extender positioned between the two side legs and extending downwardly from the main body, and wherein the intermediate extender is designed to be at least partially inserted between a cavity formed between the two flanges of the top flange portion when the locking crown is positioned about at least a portion of the anchoring clip. The locking crown can include an intermediate extender positioned between the two side legs and extending downwardly from the main body, and wherein the intermediate extender is designed to be at least partially inserted between a cavity formed between the two flanges of the top flange portion when the locking crown is positioned about at least a portion of the anchoring clip. The fluid channel arrangement can optionally include a) a fluid channel that is at least partially formed on a top surface of the main body of the locking crown and extends a majority of a longitudinal length of the main body, b) a fluid channel that is at least partially formed on a bottom surface of the main body of the locking crown and is at least partially positioned between the two side legs, and wherein the fluid channel extends a majority of a longitudinal length of the main body, c) a fluid channel that is fully formed in the main body of the locking crown and extends a majority of a longitudinal length of the main body, d) a fluid tube that is connected to a fluid tube connector that is at least partially positioned on a top surface of the main body of the locking crown, or e) a fluid tube that is connected to a fluid tube connector that is at least partially positioned in a cavity of the locking crown, and wherein the cavity is formed by a bottom surface of the main body of the locking crown and an inner surface of the two side legs of the locking crown. The anchoring clip optionally includes i) multiple component pieces, and/or ii) at least one shelf flange positioned between the base flange and the top flange portion. The present invention is also directed to a system for connecting roof or siding panels to a substructure. The system includes a) first and second panels, wherein each of the panels have a channel section and a pair of opposed side flanges; and, b) an anchoring clip system that includes an anchoring clip, a locking crown and a cap member, and wherein the anchoring clip has a base flange, a vertical wall member and a top flange portion, and wherein the base flange is adapted to be connected to the substructure, and wherein the vertical wall member is connected between the base flange and the top flange portion, and wherein the top flange portion includes two flanges spaced from one another, and wherein the locking crown includes a main body and two side legs extending downwardly from the main body, and wherein the locking crown is designed to sandwich a portion of the side flanges of the first and second panels between the two side legs and the outer surface of the top flange portion of the anchoring clip when the locking crown is positioned about at least a portion of the anchoring clip, and wherein the cap member includes a top portion and two side legs extending downwardly from the top portion, and wherein the cap member is designed to be positioned about at least a portion of the locking crown and about at least a portion of the side flanges of the first and second panels when the cap member is positioned about at least a portion of the anchoring clip so as to facilitate in maintaining the locking crown and the side flanges in position relative to the anchoring clip; and, c) a fluid channel arrangement that is designed to enable fluid to controllably flow through the anchoring clip arrangement, and wherein the fluid channel arrangement inhibits or prevents fluid flow between the side flanges and to the substructure, and wherein the fluid channel arrangement is at least partially secured to or at least partially formed by the cap member, and/or the locking crown. The locking crown optionally includes an intermediate extender that is positioned between the two side legs and extends downwardly from the main body, and wherein the intermediate extender is designed to be at least partially inserted between a cavity formed between the two flanges of the top flange portion when the locking crown is positioned about at least a portion of the anchoring clip. At least a portion of the intermediate extender is designed to be locked in the cavity between the two flanges of the top flange portion by an end of the side flange of the first panel and/or an end of the side flange of the second panel. The fluid channel optionally includes a) a fluid channel that is at least partially formed on a top surface of the top portion of the cap member and extends a majority of a longitudinal length of the top portion, b) a fluid channel that is at least partially formed on a bottom surface of the top portion of the cap member and at least partially is positioned between the two side legs, and wherein the fluid channel extends a majority of a longitudinal length of the top portion, c) a fluid channel that is at least partially positioned in a cavity of the cap member, and wherein the cavity is formed by a bottom surface of the top portion and an inner surface of the two side legs, and wherein the fluid channel extends a majority of a longitudinal length of the top portion, d) a fluid tube that is connected to a fluid tube connector that is at least partially positioned on a top surface of the top portion of the cap member, e) a fluid tube that is connected to a fluid tube connector that is at least partially positioned in a cavity of the cap member, and wherein the cavity is formed by a bottom surface of the top portion of the cap member and an inner surface of the two side legs of the cap member, f) a fluid channel that is at least partially formed on a top surface of the main body of the locking crown and extends a majority of a longitudinal length of the main body, g) a fluid channel that is at least partially formed on a bottom surface of the main body of the locking crown and is at least partially positioned between the two side legs, and wherein the fluid channel extends a majority of a longitudinal length of the main body, h) a fluid channel that is fully formed in the main body of the locking crown and extends a majority of a longitudinal length of the main body, i) a fluid tube that is connected to a fluid tube connector that is at least partially positioned on a top surface of the main body of the locking crown, or j) a fluid tube that is connected to a fluid tube connector that is at least partially positioned in a cavity of the locking crown, and wherein the cavity is formed by a bottom surface of the main body of the locking crown and an inner surface of the two side legs of the locking crown. The present invention is also directed to a cap member used to connect roof or siding panels to an anchoring clip that is connected to a substructure. The cap member includes a top portion, two side legs extending downwardly from the top portion and a fluid channel arrangement. The fluid channel arrangement includes a) a fluid channel that is at least partially formed on a top surface of the top portion and extending a majority of a longitudinal length of the top portion, b) a fluid channel that is at least partially formed on a bottom surface of the top portion and is at least partially positioned between the two side legs, and wherein the said fluid channel extends a majority of a longitudinal length of the top portion, c) a fluid channel that is at least partially positioned in a cavity of the cap member, and wherein the cavity is formed by a bottom surface of the top portion and an inner surface of the two side legs, and wherein the fluid channel extends a majority of a longitudinal length of the top portion, d) a fluid tube that is connected to a fluid tube connector that is at least partially positioned on a top surface of the top portion, or e) a fluid tube that is connected to a fluid tube connector that is at least partially positioned in a cavity of the cap member, and wherein the cavity is formed by a bottom surface of the top portion and an inner surface of the two side legs. The invention is also directed to a method of collecting or releasing heat from a panel roof or siding system that is connected to a substructure. The method includes the steps of providing first and second panels, wherein each of the panels has a channel section and a pair of opposed side flanges; b) providing an anchoring clip, wherein the anchoring clip has a base flange, a vertical wall member and a top flange portion, and wherein the base flange is adapted to be connected to the substructure, and wherein the vertical wall member is connected between the base flange and the top flange portion, and wherein the top flange portion includes two flanges that are spaced from one another; c) connecting the base flange to the substructure; d) positioning the side flange of a first panel on one side of the anchoring clip and positioning the second side flange of the second panel on an opposite side of the anchoring clip, and wherein at least a portion of the side flanges of said first and second panels is positioned on or adjacent to the top flange portion; e) providing a cap member, wherein the cap member includes a top portion and two side legs extending downwardly from the top portion; f) positioning the cap member about at least a portion of the side flanges of the first and second panels so as to facilitate in maintaining the side flanges in position relative to the anchoring clip; g) forming a fluid channel arrangement, and wherein the fluid channel arrangement inhibits or prevents fluid flow between the side flanges and to the substructure, and wherein the fluid channel arrangement includes a) a fluid channel that is at least partially formed on a top surface of the top portion of the cap member and extends a majority of a longitudinal length of the top portion of said cap ember, b) a fluid channel that is at least partially formed on a bottom surface of the top portion of the cap member and is at least partially positioned between the two side legs, and wherein the fluid channel extends a majority of a longitudinal length of the top portion, c) a fluid channel that is at least partially position in a cavity of the cap member, and wherein the cavity is formed by a bottom surface of the top portion and an inner surface of the two side legs, and wherein the fluid channel extends a majority of a longitudinal length of the top portion, d) a fluid tube that is connected to a fluid tube connector that is at least partially positioned on a top surface of the top portion of the cap member, or e) a fluid tube that is connected to a fluid tube connector that is at least partially positioned in a cavity of the cap member, and wherein the cavity is formed by a bottom surface of the top portion and an inner surface of the two side legs; and, h) flowing fluid through the fluid arrangement to transfer heat between the flowing fluid and at least one of the panels, and the anchoring clip, and/or said cap member, and wherein the flowing fluid is directed to an energy transfer device or energy conversion device after flowing through the fluid channel arrangement. The invention is also directed to a method of collecting or releasing heat from a panel roof or siding system that is connected to a substructure. The method includes the steps of a) providing first and second panels, wherein each of the panels has a channel section and a pair of opposed side flanges; b) providing an anchoring clip, wherein the anchoring clip has a base flange, a vertical wall member and a top flange portion, and wherein the base flange is adapted to be connected to the substructure, and wherein the vertical wall member is connected between the base flange and the top flange portion, and wherein the top flange portion includes two flanges spaced from one another; c) connecting the base flange to the substructure; d) positioning the side flange of a first panel on one side of said anchoring clip and positioning the second side flange of the second panel on an opposite side of the anchoring clip, and wherein at least a portion of the side flanges of the first and second panels is positioned on or adjacent to the top flange portion; e) providing a locking crown, and wherein the locking crown includes a main body and two side legs extending downwardly from the main body; f) positioning the locking crown at least partially about the top flange portion to sandwich a portion of the side flanges of the first and second panels between the two side legs and the outer surface of the top flange portion of the anchoring clip; g) providing a cap member, wherein the cap member includes a top portion and two side legs extending downwardly from said top portion; h) positioning the cap member about at least a portion of the locking crown and the side flanges of the first and second panels so as to facilitate in maintaining the locking crown and the side flanges in position relative to the anchoring clip; i) forming a fluid channel arrangement, wherein the fluid channel arrangement inhibits or prevents fluid flow between the side flanges and to the substructure, and wherein the fluid channel arrangement includes a) a fluid channel that is at least partially formed on a top surface of the top portion of the cap member and extends a majority of a longitudinal length of the top portion, b) a fluid channel that is at least partially formed on a bottom surface of the top portion of the cap member and is at least partially positioned between the two side legs, and wherein the fluid channel extends a majority of a longitudinal length of the top portion, c) a fluid channel that is at least partially positioned in a cavity of the cap member, and wherein the cavity is formed by a bottom surface of the top portion and an inner surface of the two side legs, and wherein the fluid channel extends a majority of a longitudinal length of the top portion, d) a fluid tube that is connected to a fluid tube connector that is at least partially positioned on a top surface of the top portion of the cap member, e) a fluid tube that is connected to a fluid tube connector that is at least partially positioned in a cavity of the cap member, and wherein the cavity is formed by a bottom surface of the top portion of the cap member and an inner surface of the two side legs of the cap member, f) a fluid channel that is at least partially formed on a top surface of the main body of the locking crown and extends a majority of a longitudinal length of the main body, g) a fluid channel that is at least partially formed on a bottom surface of the main body of the locking crown and is at least partially positioned between the two side legs, and wherein the fluid channel extends a majority of a longitudinal length of the main body, h) a fluid channel that is fully formed in the main body of the locking crown and extends a majority of a longitudinal length of the main body, i) a fluid tube that is connected to a fluid tube connector that is at least partially positioned on a top surface of the main body of the locking crown, or j) a fluid tube that is connected to a fluid tube connector that is at least partially positioned in a cavity of the locking crown, and wherein the cavity is formed by a bottom surface of the main body of the locking crown and an inner surface of the two side legs of the locking crown; and, j) flowing fluid through the fluid channel arrangement to transfer heat between the flowing fluid and at least one of the panels, and the anchoring clip and/or the cap member, ans wherein the flowing fluid is directed to an energy transfer device or energy conversion device after flowing through the fluid channel arrangement. The locking crown optionally includes an intermediate extender positioned between the two side legs and extending downwardly from the main body, and wherein the intermediate extender s designed to be at least partially inserted between a cavity formed between the two flanges of the to flange portion when the locking crown is positioned about at least a portion of the anchoring clip. At least a portion of the intermediate extender is optionally designed to be locked in the cavity between the two flanges of the top flange portion by an end of the side flange of the first panel and/or an end of the side flange of the second panel.

One non-limiting object of the present invention is to provide an improved anchoring system for a paneled roofing and/or siding system.

Another non-limiting object of the present invention is to provide an improved anchoring system for a paneled roofing and/or siding system that is more economical to use.

Still another non-limiting object of the present invention is to provide an improved anchoring system for a paneled roofing and/or siding system that simplifies the installation of a paneled roofing and/or siding system.

Yet another non-limiting object of the present invention is to provide an improved anchoring system for a paneled roofing and/or siding system that is formed of multiple components that can be easily connected together.

Still yet another non-limiting object of the present invention is to provide an improved anchoring system for a paneled roofing and/or siding system that can form part of an active solar thermal energy collection system on a roof system.

Another non-limiting object of the present invention is to provide an improved anchoring system for a paneled roofing and/or siding system that includes the use of active selective coatings Still another non-limiting object of the present invention is to provide an improved anchoring system for a paneled roofing and/or siding system that allows for customized connection of the roofing panels to a roof substrate.

Yet another non-limiting object of the present invention is to provide an improved anchoring system for a paneled roofing and/or siding system that includes the use of an improved cap member that includes and/or at least partially forms one or more fluid channels.

Still yet another non-limiting object of the present invention is to provide an improved anchoring system for a paneled roofing and/or siding system that includes the use of an improved cap member that enables one or more tubes or fluid conduits to be connected to the cap member.

Another non-limiting object of the present invention is to provide an improved anchoring system for a paneled roofing and/or siding system that includes the use of a locking crown that includes and/or at least partially forms one or more fluid channels.

Still another non-limiting object of the present invention is to provide an improved anchoring system for a paneled roofing and/or siding system that includes the use of a locking crown that enables one or more tubes or fluid conduits to be connected to the cap member.

Yet another non-limiting object of the present invention is to provide an improved anchoring system for a paneled roofing and/or siding system that includes the use of a locking crown that increases the strength and/or rigidity of the roofing and/or siding system and/or increases the wind uplift resistance of the roofing and/or siding system.

Still yet another non-limiting object of the present invention is to provide an improved anchoring system for a paneled roofing and/or siding system that includes the use of a locking crown that facilitates in locking one or more of the roofing and/or siding panels to the anchoring clip.

These and other objects and advantages will become apparent to those skilled in the art upon reading and following the description taken together with the accompanying drawings.

BRIEF DESCRIPTION OF THE DRAWINGS

Reference may now be made to the drawings which illustrate various non-limiting embodiments that the invention may take in physical form and in certain parts and arrangement of parts wherein:

FIG. 12 is a cross-sectional view similar to FIG. 2 and illustrates a modified cap member in accordance with the present invention; and.

DETAILED DESCRIPTION OF THE NON-LIMITING EMBODIMENTS

Figure 1:
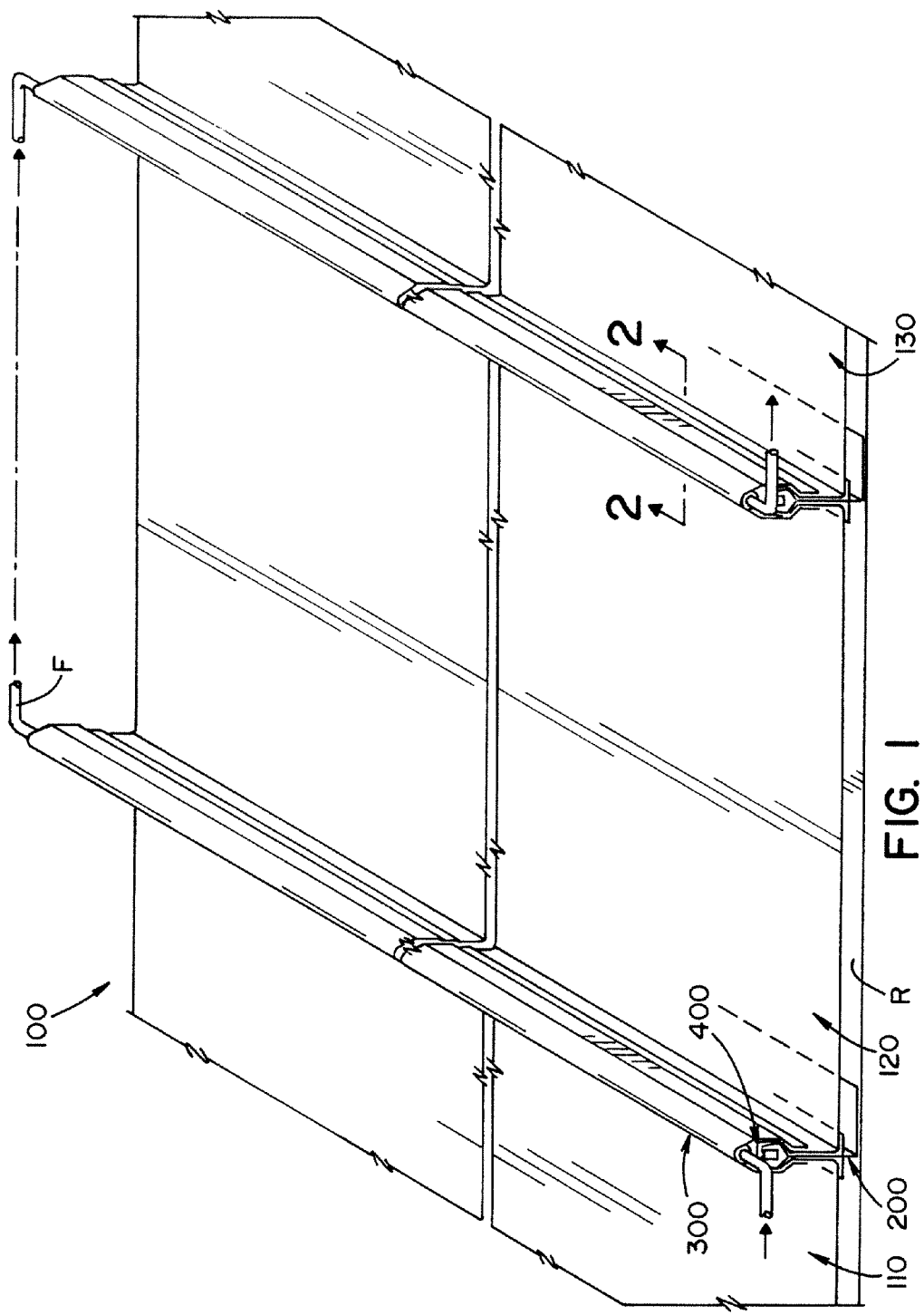
FIG. 1 is atop elevation view of a portion of a roofing system in accordance with the present invention.

Referring now to the drawings wherein the showings are for the purpose of illustrating preferred embodiments of the invention only and not for the purpose of limiting same, FIG. 1 illustrates a roofing system that includes the novel anchoring arrangement of the present invention. Although the invention will be described with particular reference to roofing systems, it will be appreciated that the anchoring arrangements of the present invention can be used with siding systems, floor systems, and other types of panel attachment systems.

Referring again to FIG. 1, there is illustrated a panel roof system 100 that is secured to a roof substrate R. The roof system includes a plurality of roof panels 110, 120, 130 that are secured to the roof substrate by an anchoring system that includes an anchoring clip 200, a cap member 300 and optionally a locking crown 400. Although only three roof panels are illustrated, it can be appreciated that more than three roof panels can be installed on the roof substrate. A sealing and/or bonding arrangement can optionally be used to facilitate in securing two or more of the components of the roof system together and/or to form a water tight seal between two or more of the roof system components. FIG. 1 illustrates that the cap member is designed to enable fluid F (e.g., water, water-antifreeze solution, etc.) to circulate through the roof system as illustrated by the arrows. The fluid generally has a viscosity that is within about 35% of the viscosity of water so that the fluid can easily flow through the roof system. The fluid can optionally include one or more temperature modifying agents that lowers the freezing point temperature of the fluid and/or raises the boiling point temperature of the fluid. The fluid can also or alternatively optionally include one or more anti-corroding agents, coloring agents, and/or anti-microbial agents. The fluid flowing through the roof system can be used to heat and/or cool other systems (e.g., swimming pool heater, heat pump for a building, etc.) and/or can be converted into energy (e.g., electric energy, etc.).

The materials used to form the roof panels and anchoring system are non-limiting. Generally the roof panels and anchoring system are formed of a metal material. The roof panels and/or one or more components of the anchoring system can optionally include one or more coatings that can be used to function as a sealant, function as a bonding agent, function as a coloring agent, function as a heat absorber/reflector, function as UV protector, function as a corrosion resistant agent, and/or function as a microorganism inhibitor.

Figure 2:
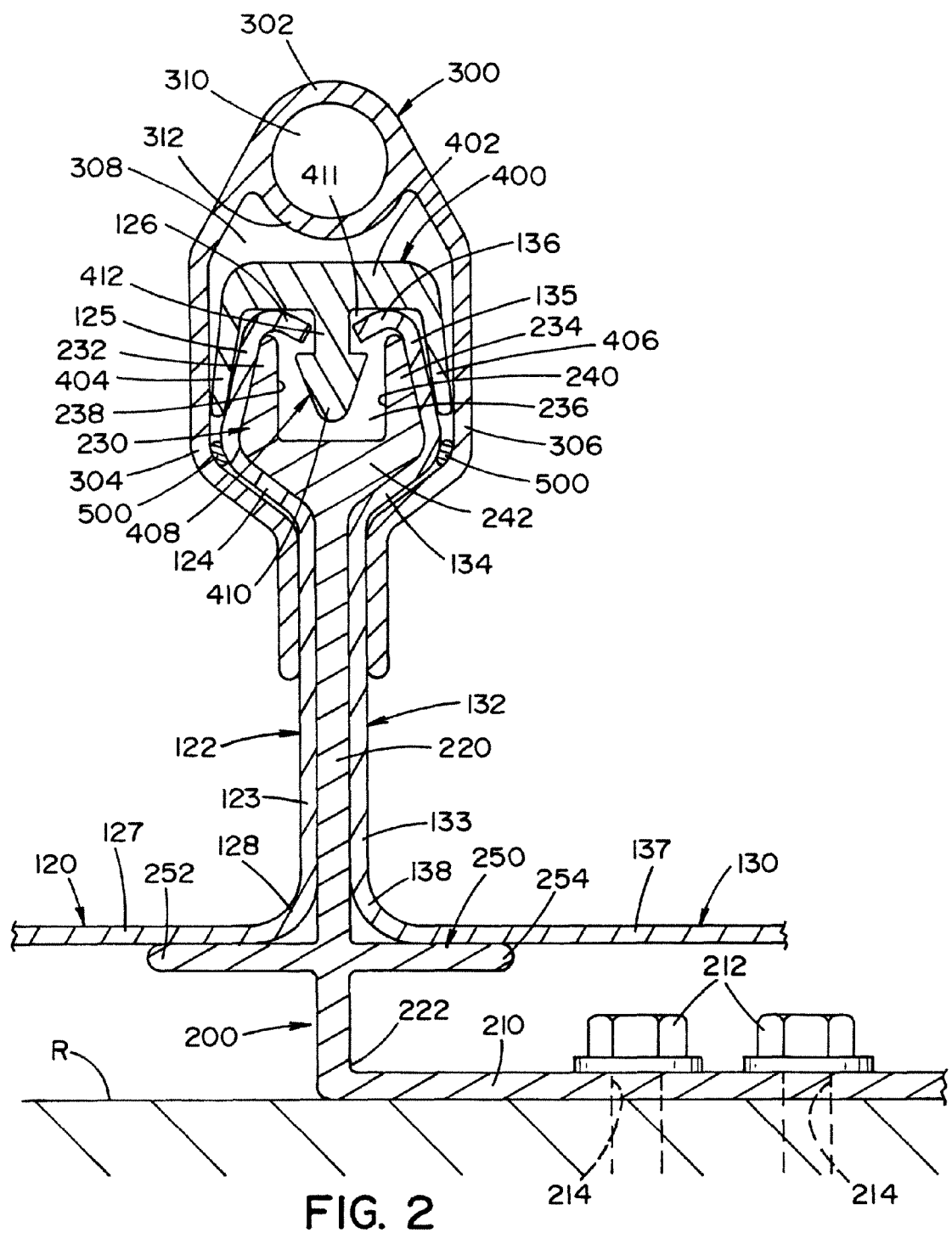
FIG. 2 is a cross-sectional view along line 2-2 of FIG. 1.

Referring now to FIG. 2, there is illustrated a cross-sectional view of one non-limiting arrangement of the anchoring system of the present invention. As illustrated in FIG. 2, the anchoring clip 200 includes a base flange 210, a vertical wall member 220, a top flange portion 230 and a shelf flange arrangement 250. The anchoring clip can be formed of one or more materials (e.g., metal, plastic, composite materials, wood, ceramic, etc.).

The anchoring clip is illustrated as including a single base flange 210; however, it can be appreciated that the anchoring clip can include two base flanges extending laterally from the bottom portion 222 of the vertical wall member 220. The base flange can be connected to a roof substrate in a variety of ways (e.g., nail, screw, rivet, adhesive, bolt and nut, etc.). As illustrated in FIG. 2, two bolts 212 are used to secure the base flange to the top of the roof substrate; however, it can be appreciated that more than or less than two bolts can be used. As adhesive, not shown, can optionally be used alone or in combination with the bolts and/or other attachment arrangements (e.g., nail, screw, tack, rivet, etc.) to secure the base flange to the roof substrate. The base flange can include preformed openings 214 for the bolts as best illustrated in FIG. 3B; however, this is not required. The length, thickness and shape of the base flange is non-limiting. The base flange is illustrated as being connected generally perpendicular to the vertical wall member; however, this is not required.

The vertical wall member is illustrated as being a flat and planar component; however, this is not required. As can be appreciated, the length, thickness and shape of the vertical wall member is non-limiting. The vertical wall member is illustrated as being integrally formed with the base flange; however, it can be appreciated that the base flange and the vertical wall member can be separately formed components that are later connected together. The vertical wall member is illustrated as being formed of a single piece; however, this is not required (e.g., two piece unit along vertical length; top portion and bottom portion that are connected together, etc.).

Figure 10:
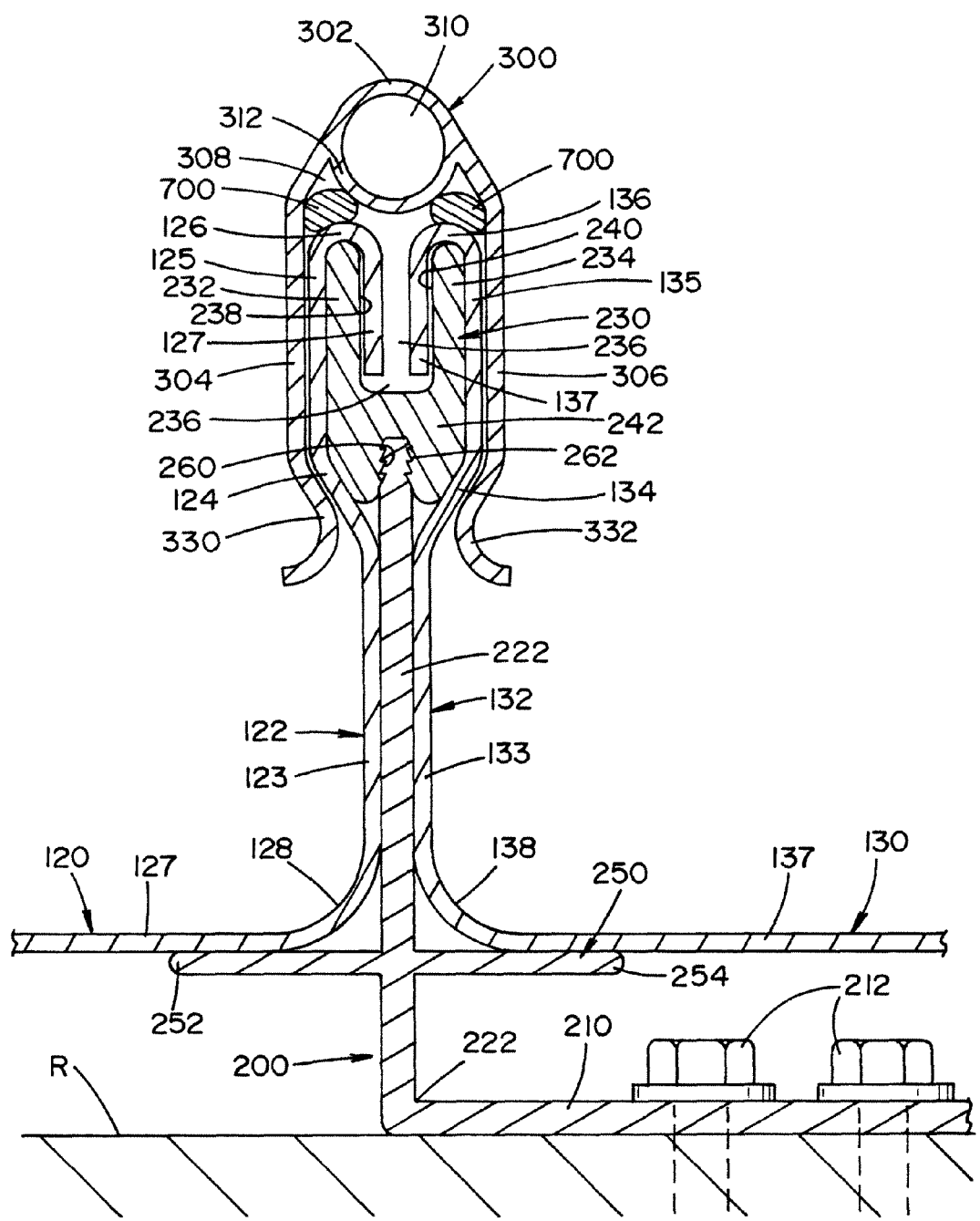
FIG. 10 is a cross-sectional view similar to FIG. 2 and illustrates a modified cap member and two piece anchoring clip in accordance with the present invention.
Figure 11:
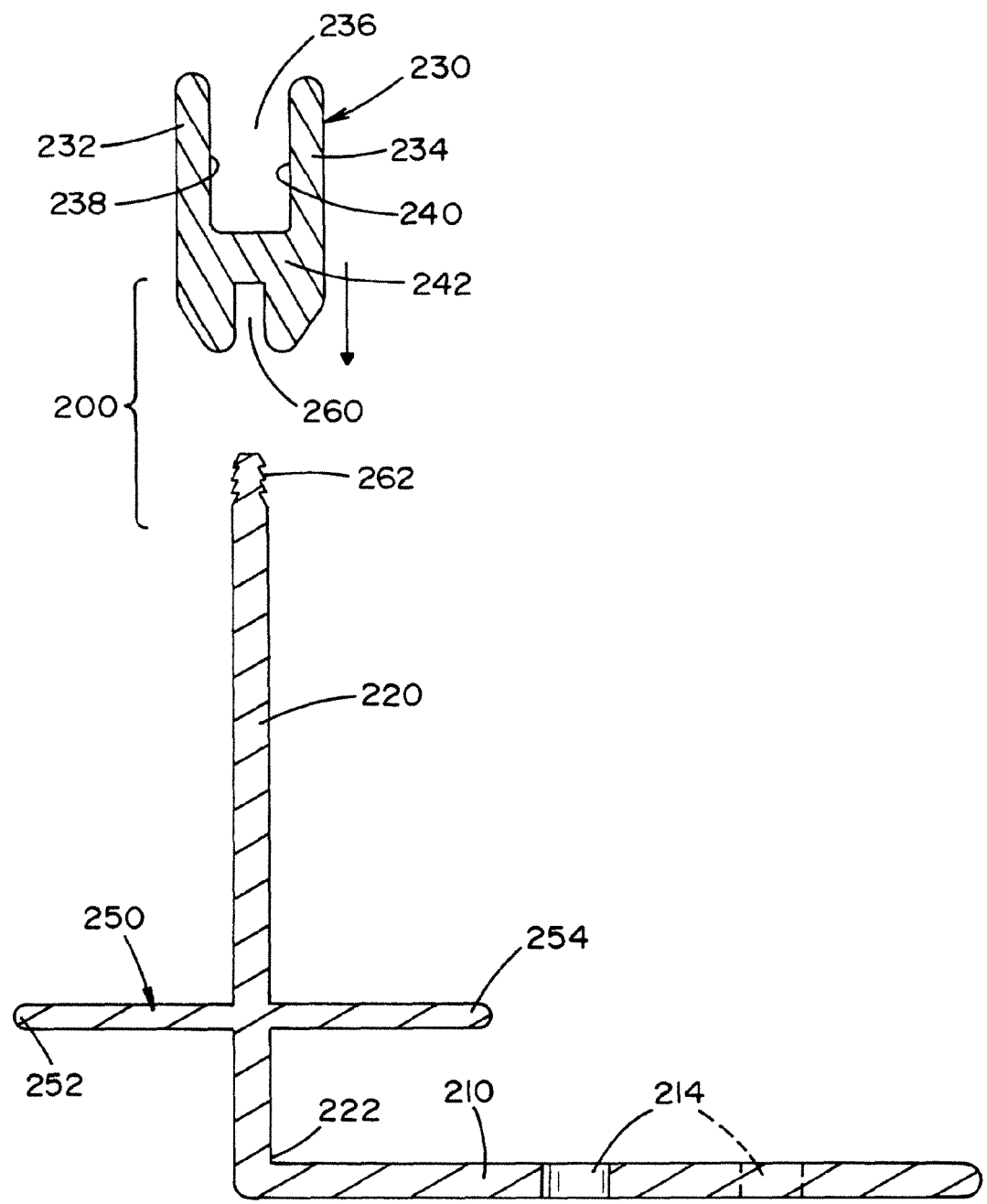
FIG. 11 is an exploded view of the two piece anchoring clip illustrated in FIG. 10.

The top flange portion 230 is illustrated as being integrally formed with the top of the vertical wall member; however, it will be appreciated that the top flange portion can be a separate component as illustrated in FIGS. 10 and 11, as described in more detail below. The flanges 232, 234 of the top flange portion 230 are illustrated as being spaced apart and extending upwardly. A flange cavity 236 is formed by the two spaced apart flanges. The two flanges have an inner surface 238, 240 that face one another and which generally lie in a parallel plane to one another and to the vertical wall member; however, it can be appreciated that the inner surface of the one or both flange can slant toward or away from the inner surface of the other flange. The flange cavity has a generally U-shaped profile; however, the flange cavity can have other profiles. As can be appreciated, the orientation of flanges on the top flange portion is non-limiting. For instance, one or more of the flanges could extend laterally outwardly so as to lie in a non-parallel plane to the wall member when the top flange portion is connected to the wall member. As illustrated in FIG.

2, the upper end of the two flanges is illustrated as being generally rounded; however, this is not required. The thickness of the two flanges along the longitudinal length of the flanges is illustrated as being non-constant; however, this is not required. The flanges are illustrated as being thicker at the base of the flange and becoming thinner at the top end of the flange. The rate thickness reduction along the longitudinal length of the flanges can be constant or varied. The outer surfaces of the flanges are illustrated as being angles toward one another; however, it can be appreciated that the outer surface of one or both flanges can be parallel to the inner surface of the flange, extend straight upwardly along the central axis of the anchoring clip, or angle outwardly from the other flange. The base 242 of the top flange portion is illustrated as sloping upwardly and outwardly from the plane of the vertical wall member or central axis of the anchoring clip and the outer surface of the two flanges is illustrated as sloping toward the plane of the vertical wall member or central axis of the anchoring clip. As can be appreciated, one or more portions of the base of the top flange portion can slope downwardly upwardly and outwardly from the plane of the vertical wall member or central axis of the anchoring clip or be extend outwardly at a perpendicular angle to the vertical wall member. In any of the these configurations of the top flange portion, the side flanges of the roof panels that are positioned adjacent to the outer surface of the top flange portion generally follow the profile of the outer surface of the top flange portion; however, this is not required. The spacing between the two flanges is non-limiting. The spacing between the flanges can be constant or vary along the length of the flanges. The height of the two flanges is non-limiting. Generally the shape, thickness and height of the two flanges are the same as illustrated in FIG. 2; however, this is not required.

The anchoring clip 200 can optionally include shelf flange arrangement 250. As illustrated in FIG. 2, the shelf flange arrangement includes two shelf flanges 252, 254. The two shelf flanges are illustrated as extending outwardly from the vertical wall member. As illustrated in FIG. 2, the shelf flanges lies in a plane that is generally perpendicular to the vertical wall member; however, this is not required. The top surface of the shelf flanges are illustrated as lying in the same plane; however, this is not required. The shape, thickness and length of the shelf flanges are not limiting. As illustrated in FIG. 2, the shape, thickness and length of shelf flanges are the same; however, this is not required. The shelf flanges are positioned below the top flange portion 230 and above the base flange 210. As illustrated in FIG. 2, the shelf flanges are designed to at least partially bear the weight of roof panels 120, 130 when the roof panels are deflected; however it will be appreciated that the shelf flanges can also act to limit deflection of the roof panels. The two shelf flanges are illustrated as being integrally formed on the vertical wall member; however, it can be appreciated that one or both of the shelf flanges can be individual pieces that have been subsequently connected (e.g., welded, soldered, bolted, etc.) to the vertical wall member. As can also be appreciated, one or both of the shelf flanges can be spaced from the vertical wall member. In such an arrangement, one or both of the shelf flanges can be integrally formed with or connected to the base flange or be spaced from the base flange and the vertical web member.

The side flanges 122, 132 of roof panels 120, 130 are illustrated as having a profile that is similar to or matches the outer profile of one or more portions of the anchoring clip (e.g., region above the shelf flanges, region above the base flange, etc.). This profile of the side flange can be partially or fully preformed prior to the side flange being connected to the anchoring clip; however, this is not required. As illustrated in FIGS. 3A-3E, the side flanges of roof panels 120, 130 are illustrated as being preformed to closely match the outer profile of the upper portion of the anchoring clip 200. As illustrated in FIGS. 2-3E, the side flange has a lower portion 123, 133 that is generally flat and planar which closely matches the flat and planar outer surface of the vertical wall member. The upper portion of the side flange includes an outward sloping portion 124, 134 which transitions into an inwardly sloping portion 125, 135 so as to closely match the outer surface profile of the upper flange portion of the anchoring clip. The ends 126, 136 of the sides flanges are curved further inwardly so as to partially overlap the top ends of flanges 232, 234. The curvature of ends 126, 136 is generally selected such that the ends lie in the same plane or slope downwardly into cavity 236. As illustrated in FIGS. 3B-3E, the curvature of ends 126, 136 is selected such that the ends are sloping downwardly into cavity 236. The bottom portion 127, 137 of roof panels 120, 130 is generally flat; however, many different surface profiles (e.g., ribbed, etc.) can be used. The bottom portion of the roof panels is illustrated as being generally perpendicular to the lower portion of the side flange; however, this is not required. The roof panels are illustrated as including a curved transition 128, 138 between the bottom portion and the lower portion of the side flange; however, this is not required. As illustrated in FIG. 2, at least a portion of the lower surface of the bottom portion of the roof panels can rest on or be positioned closely adjacent (e.g., slightly spaced above) a shelf flange 252, 254 on the anchoring clip; however, this is not required.

The anchoring clip system can optionally include a locking crown 400. The locking crown can be used as a substitute for the cap member 300, or be used in conjunction with the cap member. Locking crown 400 is an optional component, thus can be eliminated from the anchoring clip arrangement as illustrated in FIG. 10. The locking crown is designed to facilitate in securing the two side flanges 122, 132 of the roof panels to the top flange portion of the anchoring clip so as to improve the wind uplift resistance of the anchoring system. The locking crown also can be used to provide added strength and rigidity to the anchoring system so as to improve the wind uplift resistance of the anchoring system. The material used to form the locking crown is non-limiting. The locking crown can be formed of one or more pieces. As illustrated in FIG. 2, the locking crown is a one piece component. Such a one piece component can be cast, extruded, stamped, cut or the like. The locking crown includes a main body 402 and two legs 404, 406 extending downwardly from the main body. The two legs are positioned at or closely adjacent to each side of the main body. The shape, size and length of the two legs is non-limiting. As illustrated in FIG. 2, the shape, size and length of the two legs is about the same; however, this is not required. The thickness of the two legs is illustrated as decreasing along the length of the legs; however, this is not required. The main body of the locking crown is illustrated as being greater than the maximum thickness of the two legs; however, this is not required. The two legs 404, 406 are illustrated as sloping apart from one another such that the distance between the two legs nearer to the main body is less than the distance between the two legs at the end of the legs. As can be appreciated, the sloping of one or more of the legs is not required. For instance, the inside face of the two legs can be generally parallel to one another along the length of the legs or slope toward one another; however, this is not required. The sloping angle can vary or be constant along the length of the legs. As illustrated in FIG. 2, the sloping angle is generally constant along the length of the two legs. The configuration of the locking crown is such that as the locking crown is inserted onto the top flange portion of the anchoring clip, the end of the legs of the locking crown are positioned near to the outer surface of the flanges 232, 234. The relative positioning of the legs of the locking crown to the outer surface of the flanges 232, 234 is generally selected so as to maintain and/or clamp the top portion of the side flanges 122, 132 between the locking crown and the two flanges. As illustrated in FIG. 2, the two legs 404, 406 are configured so that the end of the legs approach the outer surface of the flanges 232, 234 as the locking crown is placed on the anchoring clip. As can be appreciated, the two legs 404, 406 can be configured so that the end of the legs maintain a constant distance from the outer surface of the flanges 232, 234 or move farther away from the outer surface of the flanges as the locking crown is placed on the anchoring clip. In the configuration of the locking crown illustrated in FIG. 2, the ends of legs 404, 406 clamp a portion of side flanges 122, 132 to the outer surface of flanges 232, 234 when the locking crown is fully positioned on the anchoring clip. The smallest spacing between the inner surface of legs 404, 406 and the outer surface of flanges 232, 234 when the locking crown is fully positioned on the anchoring clip is generally about 0-5 times the thickness of the material used to form the side flange that is positioned on the top flange portion of the anchoring clip. In another non-limiting configuration, the smallest spacing between the inner surface of legs 404, 406 and the outer surface of flanges 232, 234 when the locking crown is fully positioned on the anchoring clip is generally about 0-3 times the thickness of the material used to form the side flange that is positioned on the top flange portion of the anchoring clip. In still another non-limiting configuration, the smallest spacing between the inner surface of legs 404, 406 and the outer surface of flanges 232, 234 when the locking crown is fully positioned on the anchoring clip is generally about 0-2 times the thickness of the material used to form the side flange that is positioned on the top flange portion of the anchoring clip. As illustrated in FIG. 2, the smallest spacing between the inner surface of legs 404, 406 and the outer surface of flanges 232, 234 when the locking crown is fully positioned on the anchoring clip is generally about 0.1-1 times the thickness of the material used to form the side flange that is positioned on the top flange portion of the anchoring clip.

The locking crown is also illustrated as including an intermediate extender 408 that is positioned between the two legs of the locking crown and extends downwardly from the main body 402. The length, size, and shape of the intermediate extender is non-limiting. The intermediate extender includes an end 410 that has a front sloped section. As can be appreciated, the front sloped section is optional. The sloped section, when used, can have one or more sloped sides. End 410 is connected to a leg 412. The portion of end 410 that is connected to leg 412 is illustrated as having a width that is greater than the leg; however, this is not required. Such an arrangement forms a notch cavity 411 that is positioned between a portion of the bottom surface of the main body 402 and the upper surface of end 410. As will be described in more detail below, the notch cavity can be used to secure the locking crown in position by use of one or more of the side flanges of the roof panels. The width of end 410 is illustrated as narrowing along the length of the end such that the top of end 410 has a width that is less than the width of the end connected to leg 412; however, this is not required. The reduction in width of end 410 is illustrated in FIG. 2 as being generally constant and has the general shape of an arrow head; however, his is not required. When end 410 is designed to include one or more sloped sides, the one or more sloped sides can be used to a) facilitate in inserting end 410 through and at least partially past the top ends of side flanges 122, 132, and/or b) cause one or both of the top ends of side flanges 122, 132 to be bent into cavity 236 as the locking crown is inserted on the anchoring clip; however, this is not required. As illustrated in FIG. 2, end 410 is inserted past the top ends of side flanges 122, 132 when the locking crown is fully inserted onto the anchoring clip and the top ends of side flanges 122, 132 are positioned closely adjacent to the outer surface of leg 412. As is evident from FIG. 2, the spacing between the top ends of side flanges 122, 132 is less than the maximum width of end 410, thus the top ends of side flanges 122, 132 inhibit or prevent the locking crown from being removed from the anchoring clip once end 410 has been inserted past the top ends of side flanges 122, 132 In such an arrangement, the locking of the locking crown to the anchoring clip facilitates in securing the slide flanges to the anchoring clip, thereby improving the wind uplift resistance of the roofing panels. As can be appreciated, the intermediate extender can include other or additional configurations (e.g., oval end, polygonal end, etc.) and/or features (e.g., slots, ribs, grooves, notches, etc.) that can be used to i) facilitate in inserting end 410 through and at least partially past the top ends of side flanges 122, 132, ii) cause one or both of the top ends of side flanges 122, 132 to be bent into cavity 236 as the locking crown is inserted on the anchoring clip, and/or iii) inhibit or prevent the locking crown from being removed from the anchoring clip once end 410 has been inserted past the top ends of side flanges 122, 132. FIG. 2 illustrates that the width of cavity 236 is greater than the maximum width of end 410 so that end 410 can be inserted into cavity 236; however, it can be appreciated that the width of cavity 236 can be about the same as the maximum width of end 410. As can be appreciated, once the locking crown is inserted onto the anchoring clip, one or both legs of the locking crown can be bent toward the top flange portion of the anchoring clip; however, this is not required.

Although not illustrated in FIG. 2, one or more bonding and/or sealing arrangements can be used to seal and/or secure 1) one or more side flanges of the panels to the anchoring clip, 2) one or more side flanges of the panels to the locking crown, and/or 3) the locking crown to the anchoring clip.

The cap member 300 is illustrated in FIG. 2 as being inserted over the locking crown 400 and the top flange portion of the anchoring clip. As mentioned above, the anchoring clip can be used in conjunction with the locking crown or be used without the locking crown. The cap member is designed to 1) facilitate in securing the side flanges of the roof panels to the anchoring clip, 2) facilitate in securing the locking crown, when used, to the anchoring clip, and 3) cover and/or seal the top portion of the side flanges, top flange portion of the anchoring clip, and optionally the locking crown so as to inhibit or prevent fluids (e.g., rain, etc.) from entering between the side flanges and flowing on to the roof substrate. The material used to form the cap member is non-limiting. The cap member can be formed of one or more pieces. As illustrated in FIG. 2, the cap member is a one piece component. Such a one piece component can be cast, extruded, stamped, cut or the like. The cap member includes a top portion 302 and two legs 304, 306 extending downwardly from the top portion. As illustrated in FIG. 2, each of the legs includes a section that slopes or otherwise extends inwardly so that the spacing between the two legs narrows along the length of the two legs. This narrowing portion is designed to facilitate in securing the cap member to the top flange portion of the anchoring clip. The narrowing portion on one or both of the legs can be partially or fully preformed, or be bent or otherwise conformed to shape during the securing of the cap member to the anchoring clip. As illustrated in FIG. 2, the spacing of the lower section of the legs that is located beneath the top flange portion of the anchoring clip is narrower than the width of the top flange portion. Such dimension of the cap member and the top flange portion are designed to facilitate in maintaining the cap member on the anchoring clip after the cap member has been inserted onto the another clip. As also illustrated in FIG. 2, once the cap member has been inserted onto the anchoring clip, the cap member limits the movement of the locking crown, when used, so as to maintain the locking crown on the anchoring clip. The lower section of the cap member is also illustrated as maintaining the side flanges of the roof panels on or near the vertical wall member of the anchoring clip.

One or more bonding and/or sealing arrangements can be used to seal and/or secure 1) the cal member to one or more side flanges of the roof panels, 2) the cap member to the locking crown, and/or 3) cap member to the anchoring clip. As illustrated in FIG. 2, there is a sealing and/or bonding agent 500 that is positioned between legs 304, 306 and side flanges 122, 132. The sealing and/or bonding agent may be a sealing ring, elastomer sealing compound, etc. The sealing and/or bonding agent generally is pre-applied to the cap member and/or side flanges prior to the cap member being connected to the anchoring clip; however, this is not required. As can be appreciated, sealing and/or bonding agents can be applied in other or additional regions.

As illustrated in FIG. 2, a cap member 300 includes a fluid channel or passageway 310. The fluid channel is illustrated as including a circular cross-sectional shape; however, other shapes can be used. The fluid channel is illustrated as being formed by a portion of the top portion 302 and a bottom channel portion 312. As can be appreciated, the fluid channel can be formed in other ways. Fluid channel 310 is designed to enable fluid to flow through the cap member as illustrated in FIG. 1. The diameter and/or cross-sectional area of the fluid channel is not-limiting. As is illustrated in FIG. 2, the fluid channel is isolated from other components of the anchoring clip arrangement so as to minimize or prevent fluid contact of fluid flowing through the fluid channel with other portions of the cap member and other components within the cavity 308 of the cap member. In many regions, roof systems are used to collect energy and to use such energy to heat/cool a building or other type of structure and/or to generate electricity. The fluid channel in the cap member can be used to collect energy by enabling fluid to flow through the fluid channel and to be heated by the sun and/or ambient temperatures. The heated fluid can then be transported to an energy collection system that is well known in the art to use the heated fluid to heat/cool a building or other type of structure and/or to generate electricity.

The top surface of the roof panel and/or cap member can include a coating which facilitates in the collection of heat by the fluid in the fluid channel; however, this is not required. For example, the top surface of the roof panels can include a reflective coating to maintain a relatively cool temperature of the roof system, and the cap member can be coated with a material that absorbs radiation so as to facilitate in the heating of the fluid flowing through the fluid channel; however, this is not required.

Figure 4:
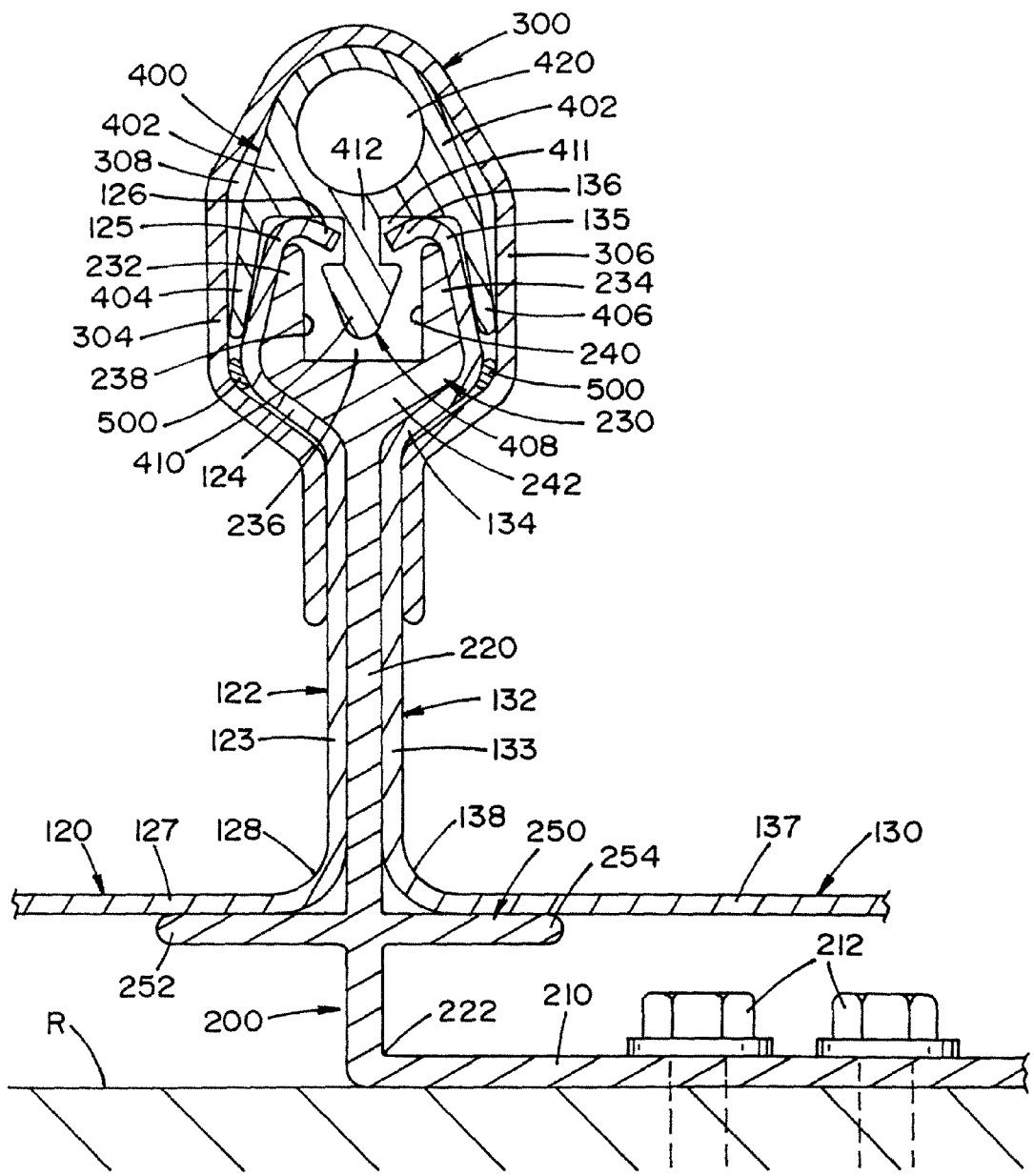
FIG. 4 is a cross-sectional view similar to FIG. 2 and illustrates a modified locking crown in accordance with the present invention.

Referring now to FIGS. 4-13, alternative non-limiting configurations of the anchoring clip, locking crown and/or cap member are illustrated. The anchoring clip arrangement illustrated in FIG. 4 is similar to the anchoring arrangement illustrated in FIG. 2 except that the cap member is absent a fluid channel and the main body 402 of the locking crown includes a fluid channel 420. The components of the anchoring system illustrated in FIG. 4 are numbered the same as the similar components of the anchoring system that is illustrated in FIG. 2. The components of the anchoring system that are the same or similar to the components of the anchoring system illustrated in FIG. 2 are designed to function in the same or similar manner, thus such functions will not repeated herein. In addition, the composition, structure, profile, etc. of components of the anchoring system that are the same or similar to the components of the anchoring system illustrated in FIG. 2 can be the same or similar, thus will not repeated herein. As indicated above, the locking crown illustrated in FIG. 4 is modified to include a fluid channel or passageway 420. This fluid passageway is a substitute for fluid channel 310 in the cap member that is illustrated in FIG. 2. As illustrated in FIG. 4, the cap member is designed to be absent a fluid channel and any structures used to form a fluid channel. The shape of the top region of the main body of the locking crown is illustrated as conforming closely to the inside surface of the cap member; however, this is not required. Such configuration of the locking crown can be used to facilitate in heat transfer from the cap member to the lock crown, which in turn transfers heat to or from the fluid flowing through fluid channel 420.

Figure 5:
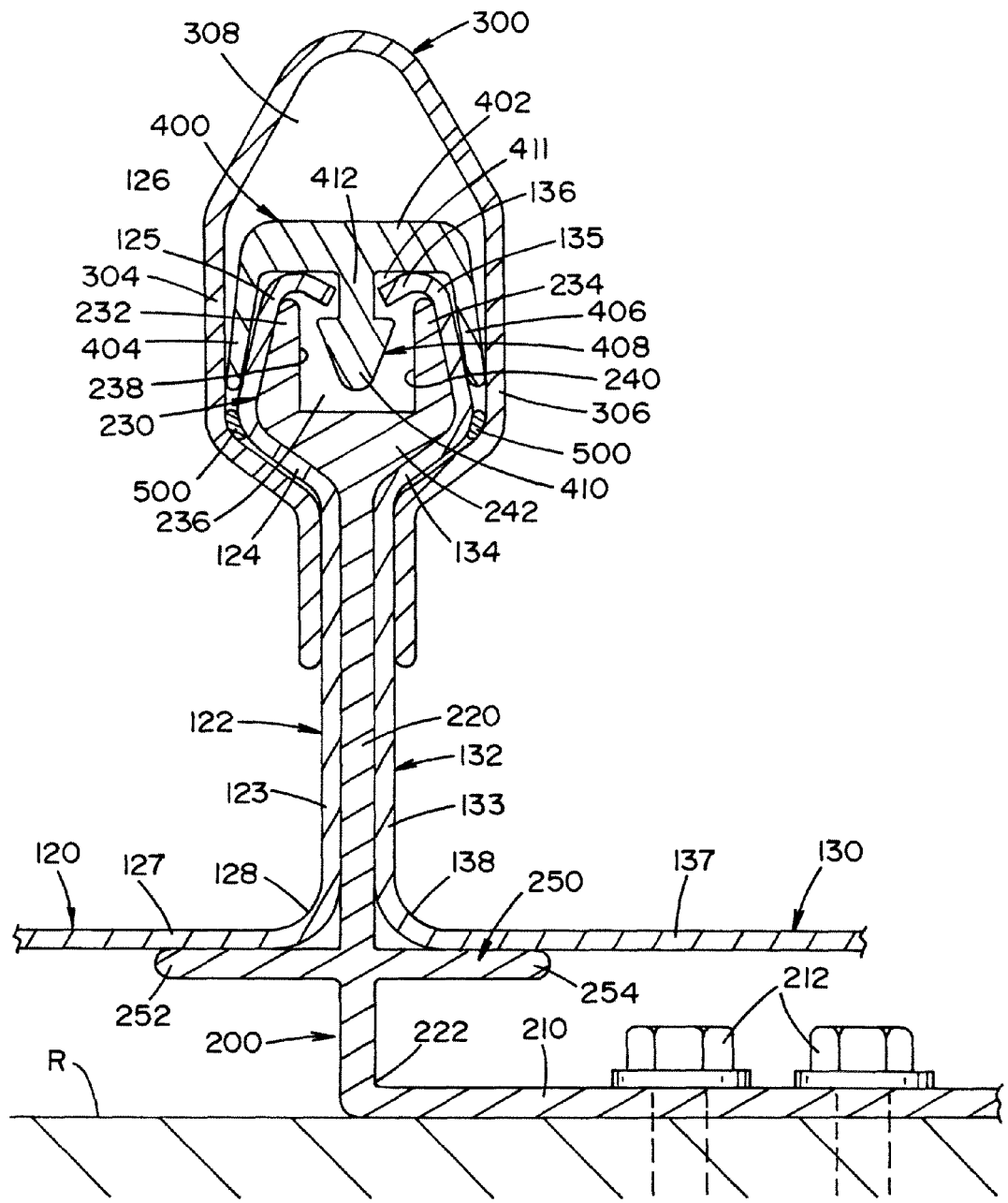
FIG. 5 is a cross-sectional view similar to FIG. 2 and illustrates a modified cap member in accordance with the present invention.

Referring now to FIG. 5, the anchoring clip arrangement illustrated in FIG. 5 is also similar to the anchoring arrangement illustrated in FIG. 2 except that the cap member is absent a fluid channel. The components of the anchoring system illustrated in FIG. 5 are numbered the same as the similar components of the anchoring system that is illustrated in FIG. 2. The components of the anchoring system that are the same or similar to the components of the anchoring system illustrated in FIG. 2 are designed to function in the same or similar manner, thus such functions will not repeated herein. In addition, the composition, structure, profile, etc. of components of the anchoring system that are the same or similar to the components of the anchoring system illustrated in FIG. 2 can be the same or similar, thus will not repeated herein. As indicated above, the cap member illustrated in FIG. 5 is modified to be absent a fluid channel or passageway 310 and any structures used to form a fluid channel. In this arrangement, the anchoring system may or may not be used to convey fluid. If fluid is conveyed through the anchoring system, cavity 308 of the cap member in conjunction with the locking crown and/or side flanges can be used to form the fluid channel. Sealing and/or bonding agent 500 can be used to form a fluid seal between the cap member and the side flanges. Additional sealing and/or bonding agents can additionally or alternatively be used to form a fluid seal between the cap member and locking crown, locking crown and/or side flanges, side flanges and upper flange portion of the anchoring clip, and/or locking crown and upper flange portion of the anchoring clip; however, this is not required.

Figure 6:
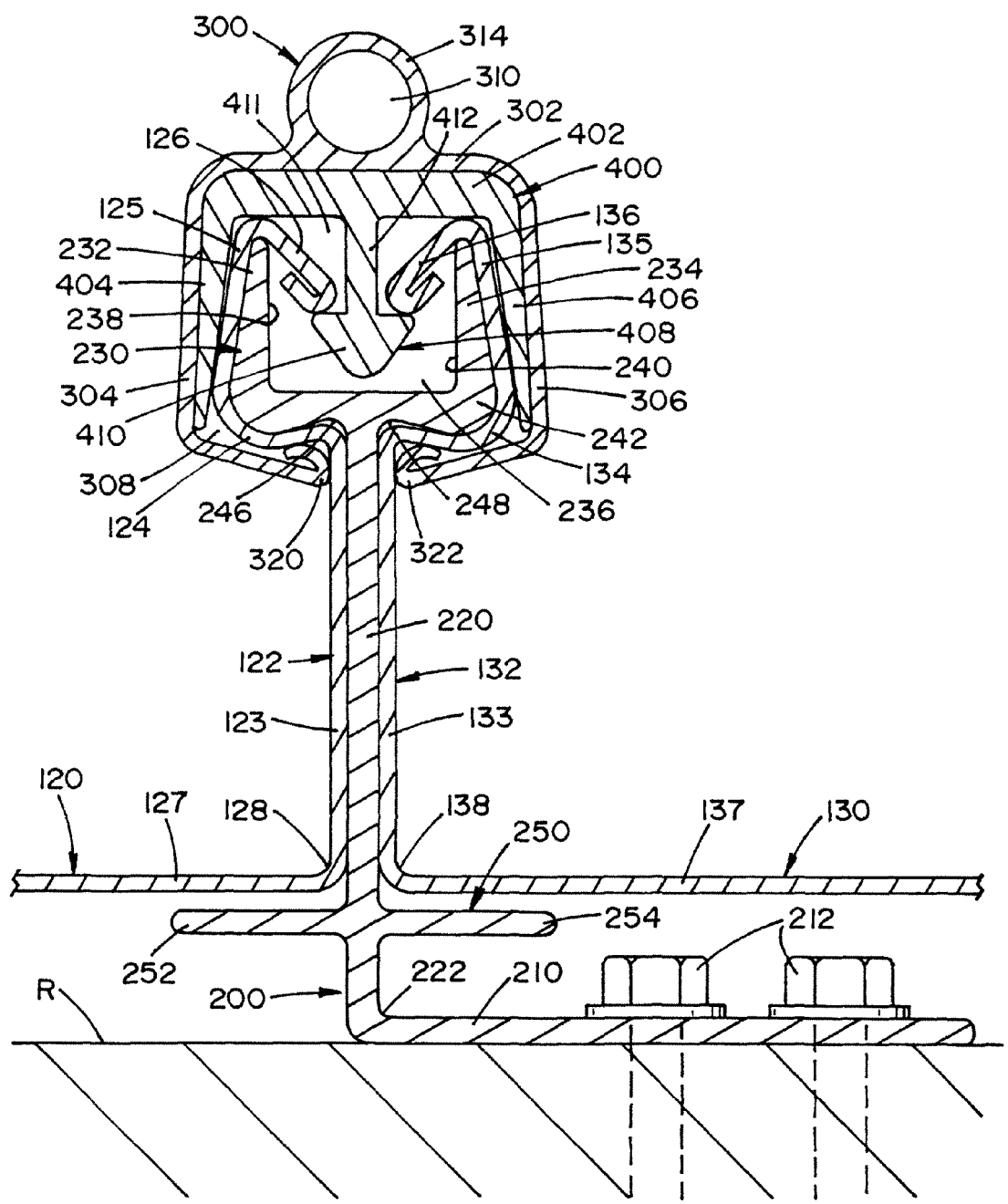
FIG. 6 is a cross-sectional view similar to FIG. 2 and illustrates a modified cap member in accordance with the present invention.

Referring now to FIG. 6, the anchoring clip arrangement illustrated in FIG. 6 is also similar to the anchoring arrangement illustrated in FIG. 2 except that the cap member has a different configuration, the fluid channel is positioned on the outer surface of the cap member, the profile of the side flanges of the roof panels is modified, the length of the legs on the locking crown are modified, and the shape of the top flange portion of the anchoring clip is modified. The components of the anchoring system illustrated in FIG. 6 are numbered the same as the similar components of the anchoring system that is illustrated in FIG. 2. The components of the anchoring system that are the same or similar to the components of the anchoring system illustrated in FIG. 2 are designed to function in the same or similar manner, thus such functions will not be repeated herein. In addition, the composition, structure, profile, etc. of components of the anchoring system that are the same or similar to the components of the anchoring system illustrated in FIG. 2 can be the same or similar, thus will not be repeated herein. As indicated above, the cap member illustrated in FIG. 6 is modified to include a fluid channel or passageway 310 on the upper surface of the top portion of the cap member. The fluid channel is formed by an upper channel portion 314 that is connected to the top portion 302 of the cap member. The upper channel portion is illustrated as being integrally formed on the top portion; however, it can be appreciated that the upper channel portion is a separate component that can be connected by some arrangement (e.g., weld, solder, melted seam, clamp, screw, bolt, adhesive, etc.) to the top portion of the cap member. The fluid channel can have the same or similar function as the fluid channel of the cap member illustrated in FIG. 2. The shape of the top portion of the cap member is also modified to conform with the shape of the outer surface of the locking crown 400. As can be appreciated, the top portion of the cal member can be shaped similarly to the shape illustrated in FIG. 2; however, this is not required As such, the size of cavity 308 is significantly reduced or eliminated. The legs 304, 306 of the cap member are also modified to be shorter and to rest under the bottom of the top flange portion. The bottom of the top flange portion 230 includes two recesses 246, 248. The upper portion of the side flanges includes a profile that closely matches the outer profile of the upper flange portion of the anchoring clip. The ends of the side flanges of the roof panels also overlap; however, this is not required. All or a portion of the side flanges can be preformed to match or closely match the profile of the side flange illustrated in FIG. 6; however, this is not required. The ends 320, 322 of the legs of the cap member are positioned under the recesses of the top flange portion so as to facilitate in securing the cap member to the anchoring clip. The ends of the legs of the cap member are illustrated as being folded over; however, this is not required. The legs of the locking crown are extended to provide additional clamping of the side flange of the roof panels to the anchoring clip; however, the modification of the legs of the locking crown is not required. A sealing and/or bonding agent is absent from the anchoring clip system illustrated in FIG. 6; however, it can be appreciated that a sealing and/or bonding agent can be used. As can be appreciated, the configuration of the locking crown illustrated in FIG. 6 may alternatively be the same as the configuration of the locking crown illustrated in FIG. 2 or vice-versa. As also can be appreciated, the configuration of the legs of the cap member illustrated in FIG. 6 may alternatively be the same as the legs of the cap member illustrated in FIG. 2 or vice-versa.

Figure 7:
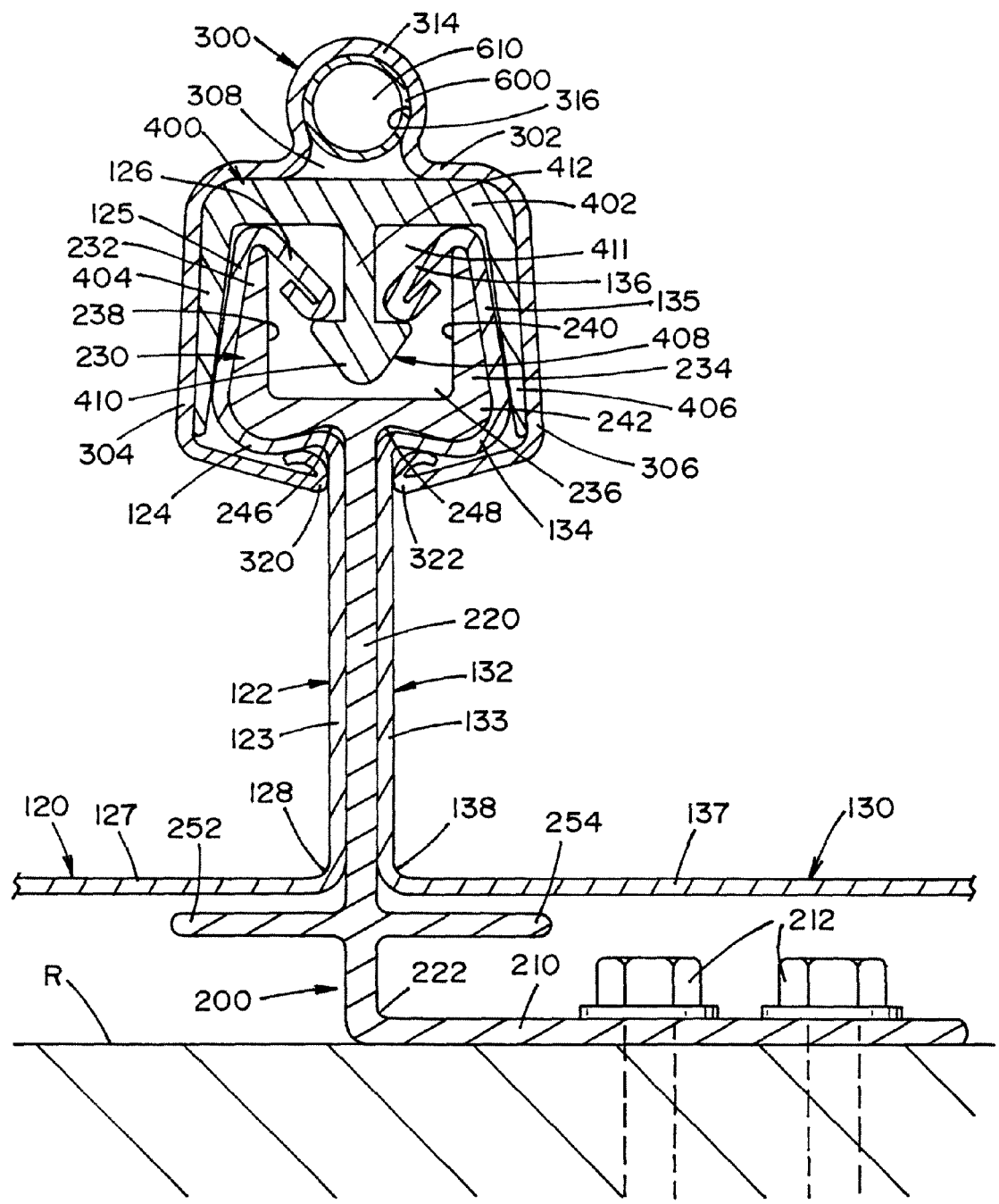
FIG. 7 is a cross-sectional view similar to FIG. 2 and illustrates a modified cap member in accordance with the present invention.

Referring now to FIG. 7, the anchoring clip arrangement illustrated in FIG. 7 is also similar to the anchoring arrangement illustrated in FIGS. 2 and 6. The anchoring clip arrangement illustrated in FIG. 7 is the same as illustrated in FIG. 6 except that the cap member has a different configuration, the profile of the side flanges of the roof panels is modified, the length of the legs on the locking crown are modified, and the shape of the top flange portion of the anchoring clip is modified as compared to the components of the anchoring system illustrated in FIG. 2. The cap member illustrated in FIG. 7 is also modified such that a fluid tube or conduit 600 can be connected to the cap member. The components of the anchoring system illustrated in FIG. 7 are numbered the same as the similar components of the anchoring system that is illustrated in FIGS. 2 and 6. The components of the anchoring system that are the same or similar to the components of the anchoring system illustrated in FIGS. 2 and 6 are designed to function in the same or similar manner, thus such functions will not be repeated herein. In addition, the composition, structure, profile, etc. of components of the anchoring system that are the same or similar to the components of the anchoring system illustrated in FIGS. 2 and 6 can be the same or similar, thus will not be repeated herein. As indicated above, the cap member illustrated in FIG. 7 is modified to include a modified top portion 302 that includes an upper channel portion 314. The upper channel portion is connected at both ends to top portion 302. The tube cavity 316 formed by the upper channel portion opens into cavity 308. Such an arrangement enables a fluid tube or fluid conduit to be secured into the tube cavity. The opening of the tube cavity into cavity 308 is illustrated as being smaller than the maximum width of the tube cavity; however, this is not required. Such a tube cavity configuration allows for a fluid tube (e.g., plastic tube, rubber tube, etc.) to be inserted into the tube cavity and then be retained in the tube cavity. As can be appreciated, other or alternative arrangements can be used to secure a fluid tube or fluid conduit in the tube cavity (e.g., adhesive, clamp, solder, weld, bracket, etc.). The upper channel portion is illustrated as being integrally formed on the top portion; however, it can be appreciated that the upper channel portion is a separate component that can be connected by some arrangement (e.g., weld, solder, melted seam, clamp, screw, bolt, adhesive, etc.) to the top portion of the cap member. The fluid tube or fluid conduit that is secured into the tube cavity can have the same or similar function as the fluid channel of the cap member illustrated in FIG. 2.

Figure 8:
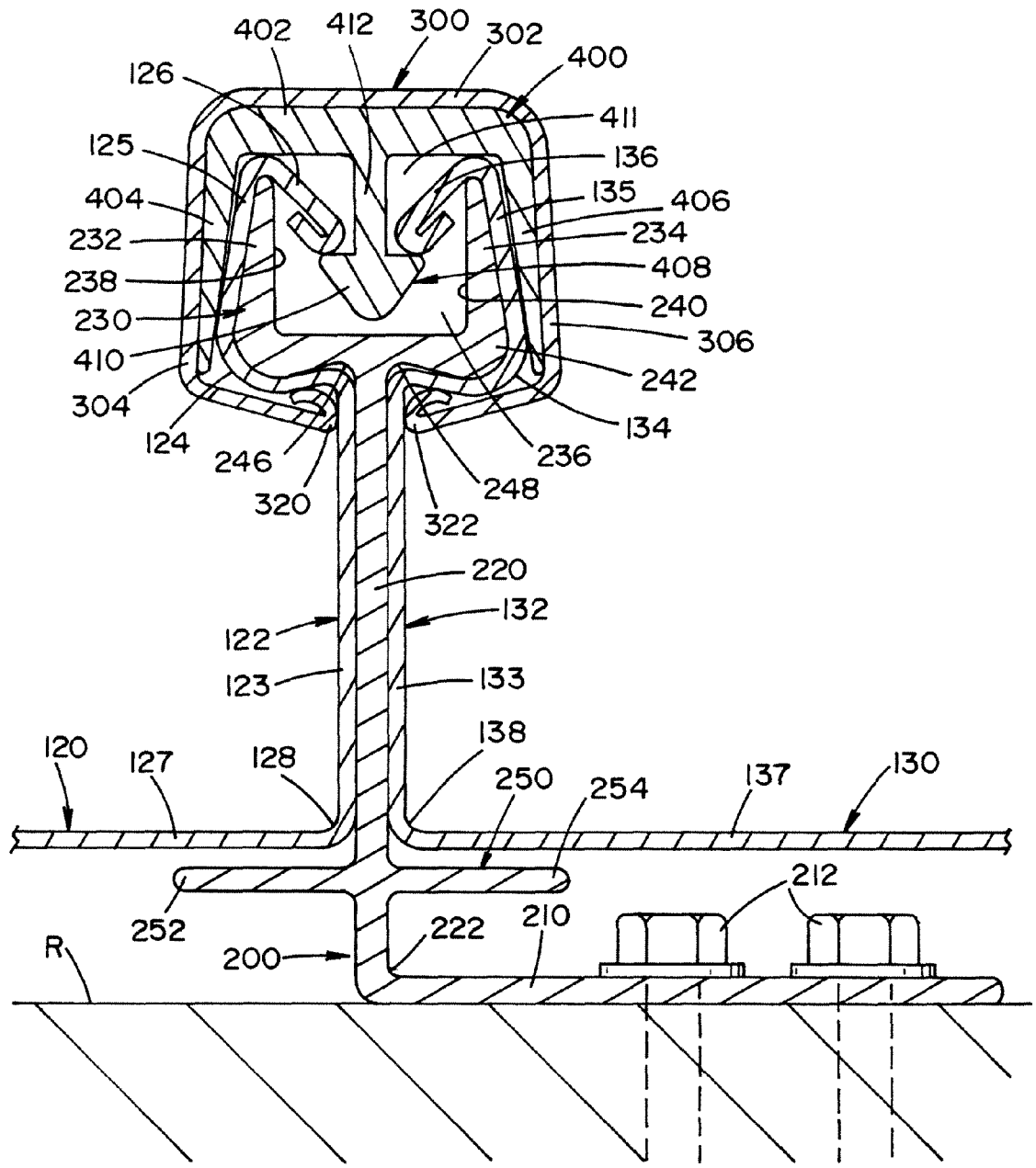
FIG. 8 is a cross-sectional view similar to FIG. 2 and illustrates a modified cap member in accordance with the present invention.

Referring now to FIG. 8, the anchoring clip arrangement illustrated in FIG. 8 is also similar to the anchoring arrangement illustrated in FIGS. 2 and 6. The anchoring clip arrangement illustrated in FIG. 8 is the same as illustrated in FIG. 6 except that the cap member has a different configuration, the profile of the side flanges of the roof panels is modified, the length of the legs on the locking crown are modified, and the shape of the top flange portion of the anchoring clip is modified as compared to the components of the anchoring system illustrated in FIG. 2. The cap member illustrated in FIG. 8 is also modified so as to eliminate a fluid channel in the cap member. The components of the anchoring system illustrated in FIG. 8 are numbered the same as the similar components of the anchoring system that is illustrated in FIGS. 2 and 6. The components of the anchoring system that are the same or similar to the components of the anchoring system illustrated in FIGS. 2 and 6 are designed to function in the same or similar manner, thus such functions will not repeated herein. In addition, the composition, structure, profile, etc. of components of the anchoring system that are the same or similar to the components of the anchoring system illustrated in FIGS. 2 and 6 can be the same or similar, thus will not repeated herein. As indicated above, the cap member illustrated in FIG. 8 is modified so as to not include a fluid channel. Fluid could be directed through cavity 236 of the top flange portion of the anchoring clip; however, this is an optional configuration. If fluid was to travel in cavity 236, a sealing and/or bonding agent, not shown, would generally be used to form a fluid seal between the lock crown and the side flanges, and/or the anchoring clip and the side flanges; however, this is not required.

Figure 9:
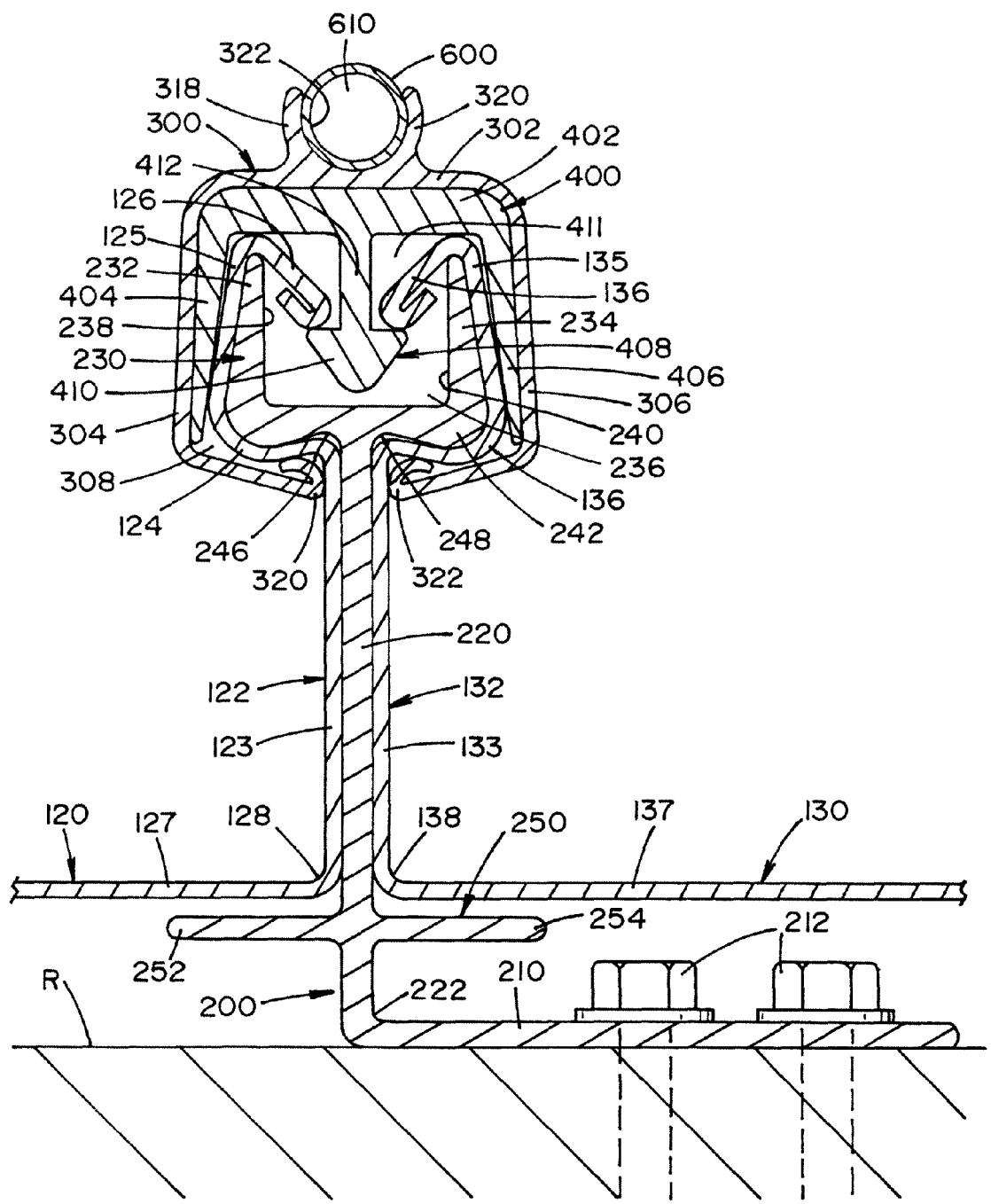
FIG. 9 is a cross-sectional view similar to FIG. 2 and illustrates a modified cap member in accordance with the present invention.

Referring now to FIG. 9, the anchoring clip arrangement illustrated in FIG. 9 is also similar to the anchoring arrangement illustrated in FIGS. 2, 6 and 7. The anchoring clip arrangement illustrated in FIG. 9 is the same as illustrated in FIG. 6 except that the cap member has a different configuration, the profile of the side flanges of the roof panels is modified, the length of the legs on the locking crown are modified, and the shape of the top flange portion of the anchoring clip is modified as compared to the components of the anchoring system illustrated in FIG. 2. The cap member illustrated in FIG. 9 is also modified such that a fluid tube or conduit can be connected to the top of the cap member. The components of the anchoring system illustrated in FIG. 9 are numbered the same as the similar components of the anchoring system that is illustrated in FIGS. 2, 6 and 7. The components of the anchoring system that are the same or similar to the components of the anchoring system illustrated in FIGS. 2, 6 and 7 are designed to function in the same or similar manner, thus such functions will not repeated herein. In addition, the composition, structure, profile, etc. of components of the anchoring system that are the same or similar to the components of the anchoring system illustrated in FIGS. 2, 6 and 7 can be the same or similar, thus will not be repeated herein. As indicated above, the cap member illustrated in FIG. 9 is modified to include a modified top portion 302 that includes two arm clips 318, 320. The two arm clips are connected to top portion 302 and extend upwardly from the top portion. Positioned between the two arm clips is a tube cavity 322. Such an arrangement enables a fluid tube or fluid conduit to be secured into the tube cavity. The tube cavity can be configured to allow a fluid tube (e.g., plastic tube, rubber tube, etc.) to be inserted into the tube cavity and then be retained in the tube cavity. As can be appreciated, other or alternative arrangements can be used to secure a fluid tube or fluid conduit in the tube cavity (e.g., adhesive, clamp, solder, weld, bracket, etc.). The two arm clips are illustrated as being integrally formed on the top portion; however, it can be appreciated that the two arm clips can be separate components that are connected by some arrangement (e.g., weld, solder, melted seam, clamp, screw, bolt, adhesive, etc.) to the top portion of the cap member. The fluid tube or fluid conduit that is secured into the tube cavity can have the same or similar function as the fluid channel of the cap member illustrated in FIG. 2. This arrangement allows the fluid tube or fluid conduit 600 to be inserted in the tube cavity after the anchoring clip arrangement has been fully assembled.

Referring now to FIGS. 9 and 10, the anchoring clip arrangement is a modification of the previously described anchoring clip arrangement illustrated in FIGS. 2 and 4-8 in that the locking crown is not used. In addition, the anchoring clip 200 is a two piece arrangement wherein the top flange portion is connectable to the vertical wall member. Due to the absence of the locking crown, the profile of the anchoring clip, side flanges of the roof panel and cap member are also different from such components illustrated in FIG. 2. The components of the anchoring system illustrated in FIGS. 10 and 11 are numbered the same as the similar components of the anchoring system that is illustrated in FIG. 2. The components of the anchoring system that are the same or similar to the components of the anchoring system illustrated in FIG. 2 are designed to function in the same or similar manner, thus such functions will not be repeated herein. In addition, the composition, structure, profile, etc. of components of the anchoring system that are the same or similar to the components of the anchoring system illustrated in FIG. 2 can be the same or similar, thus will not be repeated herein. As indicated above, the anchoring clip 200 illustrated in FIGS. 10 and 11 is modified to be a multi-piece unit. The top flange portion 230 is a separate piece that is connectable to the top of the vertical wall member 220. The top flange portion can be connected to the vertical wall member by many different arrangement. In one non-limiting arrangement that is illustrated in FIGS. 10 and 11, the top of the vertical wall member includes a rib and/or slot arrangement 262. The bottom o f the top flange portion includes a connection cavity 260 that includes a rib and/or slot arrangement that is designed to connect to rib and/or slot arrangement 262. In one non-limiting configuration, the top flange portion is designed to slip horizontally onto the top of the vertical wall member. In such an arrangement, the base flange of the anchoring clip can be first connected to the roof substrate R and then the top flange portion can be subsequently connected to the top of the vertical wall member; however, this is not required.

The top flange portion 230 includes two flanges 232, 234. The other surface of the flanges is not sloped as the flanges illustrated in FIG. 2; however, it can be appreciated that the flanges illustrated in FIGS. 10 and 11 can be sloped. As illustrated in FIGS. 10 and 11, the outside surface and inside surface of the flanges are generally parallel to one another; however, this is not required. The size of cavity 236 is generally smaller than the similar cavity illustrated in FIG. 2; however, this is not required. The profile of the side flanges of the roof panels is modified so as to exactly or closely match the outer profile of the anchoring clip. The profile of the side flanges can be partially or fully preformed prior to be connected to the anchoring clip; however, this is not required.

The cap member 300 includes two side legs 304, 306 that include modified ends 330, 332. The modified ends curve outwardly. These modified ends are designed to facilitate in connecting the cap member to the anchoring clip and/or removing the cap member from the another clip.

A sealing and/or bonding agent 700 is positioned between the cap member and side flanges of the roof panels so as to form a seal and/or bond between such components. The sealing and/or bonding agent 500 can also or alternatively be used to form a fluid seal between the cap member and the side flanges. As can be appreciated, the sealing and/or bonding agent, when used, can be used in other or alternative location in the anchoring clip system.

Figure 12:
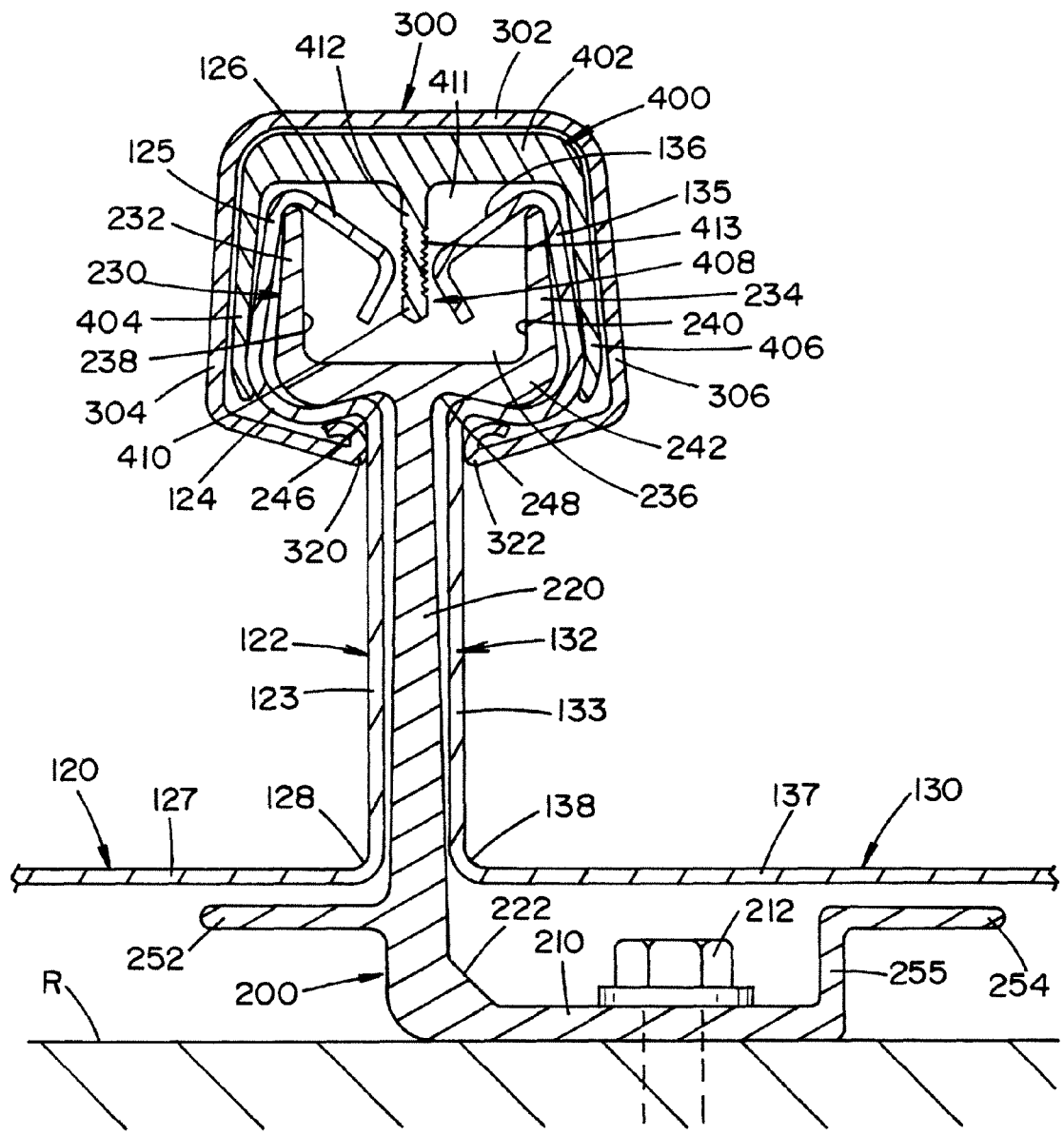

Referring now to FIG. 12, the anchoring clip arrangement illustrated in FIG. 12 is also similar to the anchoring arrangement illustrated in FIGS. 2, 6 and 8. The anchoring clip arrangement illustrated in FIG. 12 is the same as illustrated in FIG. 8 except that the locking crown has a differently configured intermediate extender, the ends of the side flanges of the roof panels are configured differently, the shelf flanges on the anchoring clip are configured differently, and the base flange of the anchoring clip is secured to the roof substrate differently. The components of the anchoring system illustrated in FIG. 12 are numbered the same as the similar components of the anchoring system that is illustrated in FIGS. 2, 6 and 8. The components of the anchoring system that are the same or similar to the components of the anchoring system illustrated in FIGS. 2, 6 and 8 are designed to function in the same or similar manner, thus such functions will not repeated herein. In addition, the composition, structure, profile, etc. of components of the anchoring system that are the same or similar to the components of the anchoring system illustrated in FIGS. 2, 6 and 8 can be the same or similar, thus will not repeated herein. As indicated above, the cap member illustrated in FIG. 12 is modified so as to not include a fluid channel. Fluid could be directed through cavity 236 of the top flange portion of the anchoring clip; however, this is an optional configuration. If fluid was to travel in cavity 236, a sealing and/or bonding agent, not shown, would generally be used to form a fluid seal between the lock crown and the side flanges, and/or the anchoring clip and the side flanges; however, this is not required. The intermediate extender 408 of the locking crown has a different profile than the intermediate extender illustrated in FIGS. 2, 6 and 8. The leg 412 and end 410 of the intermediate extender is illustrated as having a generally constant width; however, this is not required. A portion of the outer surface of leg 412 includes one or more teeth 413. The one or more teeth can be used to frictionally engage one or both ends 126, 136 of the side panels of the two roof panels so as to inhibit or prevent removal of the locking crown after is as been inserted on the anchoring clip; however, this is not required. The shapes of the ends of the side flanges are shown to be not as bent as in FIGS. 2, 6 and 8. The amount of bending, if any, of the ends of the side flanges is non-limiting. The ends of the legs of the locking crown are illustrated as being slightly bent inwardly. This optional bending of the leg ends can be used to facilitate is maintaining the locking crown on the side flanges; however, this is not required. The base flange 210 of the anchoring clip is illustrated as being modified so as to include shelf flange 254. A flange leg 255 is connected between the base flange and the shelf flange. Shelf flange 252 is illustrated as being connected to vertical wall member 220; however, it can be appreciated that shelf flange 252 can be connected to a base flange in a similar manner as shelf flange 254. The vertical height of the two shelf flanges and the top flanges from the bottom of the anchoring clip are illustrated as being substantially the same; however, this is not required. A single bolt 212 is illustrated as securing the base flange to the roof substrate; however, it can be appreciated, that more than one bolt can be used.

Figure 13:
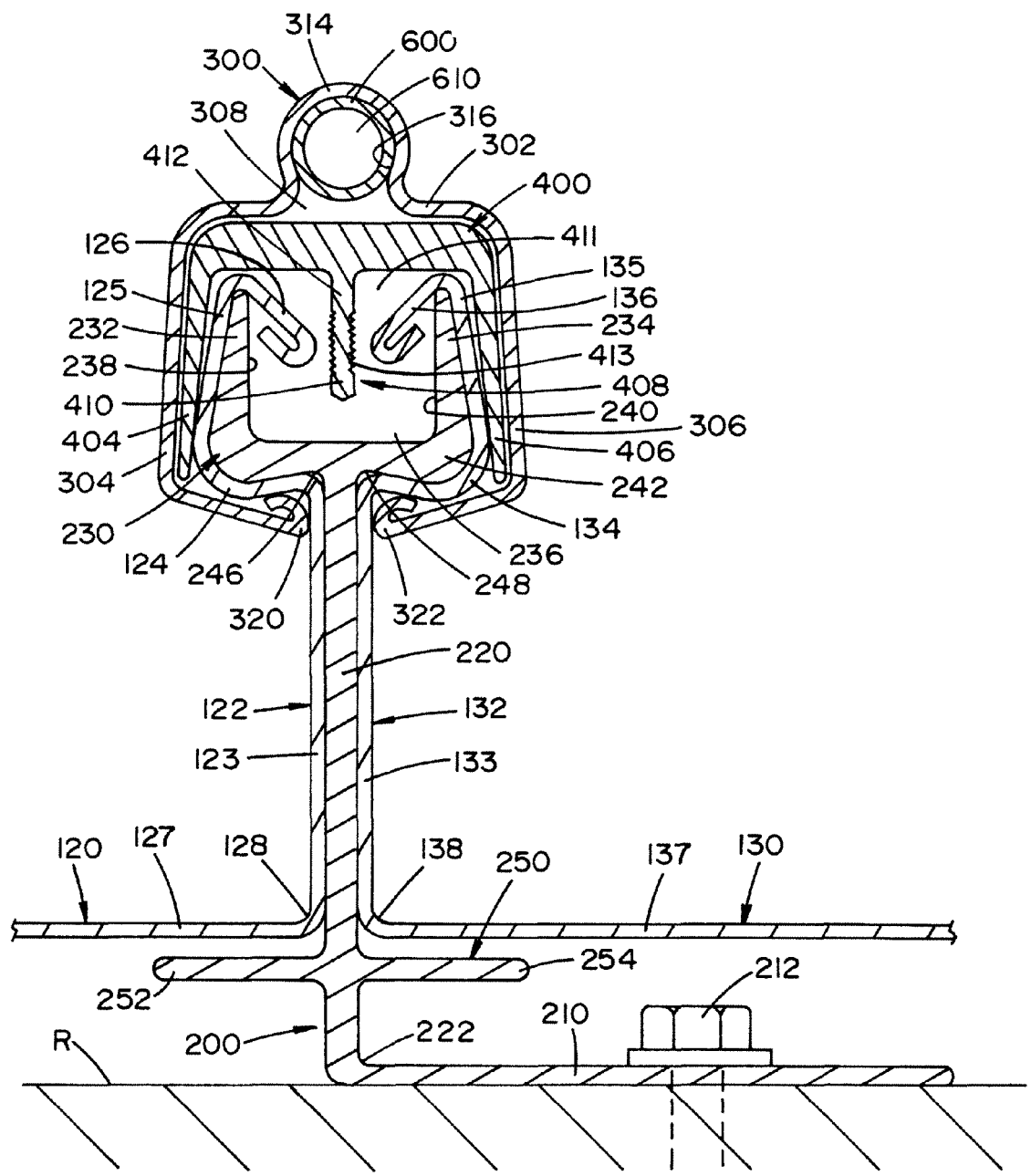
FIG. 13 is a cross-sectional view similar to FIG. 2 and illustrates a modified cap member in accordance with the present invention.

Referring now to FIG. 13, the anchoring clip arrangement illustrated in FIG. 13 is also similar to the anchoring arrangement illustrated in FIGS. 2, 6 and 7. The anchoring clip arrangement illustrated in FIG. 13 is the same as illustrated in FIG. 6 except that the intermediate portion of the locking crown has a different configuration. The cap member illustrated in FIG. 13 is modified such that a fluid tube or conduit 600 can be connected to the cap member. The components of the anchoring system illustrated in FIG. 13 are numbered the same as the similar components of the anchoring system that is illustrated in FIGS. 2, 6 and 7. The components of the anchoring system that are the same or similar to the components of the anchoring system illustrated in FIGS. 2, 6 and 7 are designed to function in the same or similar manner, thus such functions will not be repeated herein. In addition, the composition, structure, profile, etc. of components of the anchoring system that are the same or similar to the components of the anchoring system illustrated in FIGS. 2, 6 and 7 can be the same or similar, thus will not be repeated herein. As indicated above, the cap member illustrated in FIG. 13 is modified to include a modified top portion 302 that includes an upper channel portion 314. The upper channel portion is connected at both ends to top portion 302. The tube cavity 316 formed by the upper channel portion opens into cavity 308. Such an arrangement enables a fluid tube or fluid conduit to be secured into the tube cavity. The opening of the tube cavity into cavity 308 is illustrated as being smaller than the maximum width of the tube cavity; however, this is not required. Such a tube cavity configuration allows for a fluid tube (e.g., plastic tube, rubber tube, etc.) to be inserted into the tube cavity and then be retained in the tube cavity. As can be appreciated, other or alternative arrangements can be used to secure a fluid tube or fluid conduit in the tube cavity (e.g., adhesive, clamp, solder, weld, bracket, etc.). The upper channel portion is illustrated as being integrally formed on the top portion; however, it can be appreciated that the upper channel portion is a separate component that can be connected by some arrangement (e.g., weld, solder, melted seam, clamp, screw, bolt, adhesive, etc.) to the top portion of the cap member. The fluid tube or fluid conduit that is secured into the tube cavity can have the same or similar function as the fluid channel of the cap member illustrated in FIGS. 2 and 7. The intermediate extender 408 of the locking crown has a different profile than the intermediate extender illustrated in FIGS. 2, 6 and 7. The leg 412 and end 410 of the intermediate extender is illustrated as having a generally constant width; however, this is not required. A portion of the outer surface of leg 412 includes one or more teeth 413. The one or more teeth can be used to frictionally engage one or both ends 126, 136 of the side panels of the two roof panels so as to inhibit or prevent removal of the locking crown after is as been inserted on the anchoring clip; however, this is not required. A single bolt 212 is illustrated as securing the base flange to the roof substrate; however, it can be appreciated, that more than one bolt can be used.

Figure 3A:
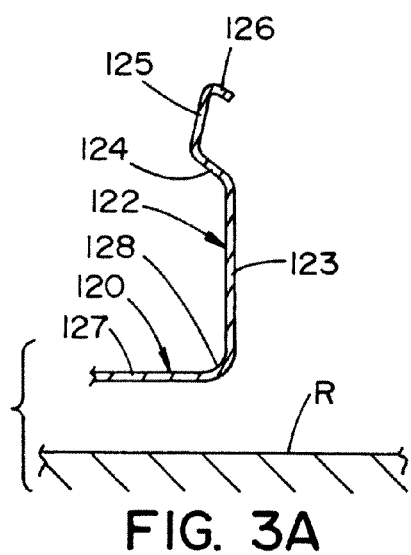
FIGS. 3A-3H is a non-limiting method of installing the roofing system in accordance with the present invention on a roof substrate.
Figure 3B:
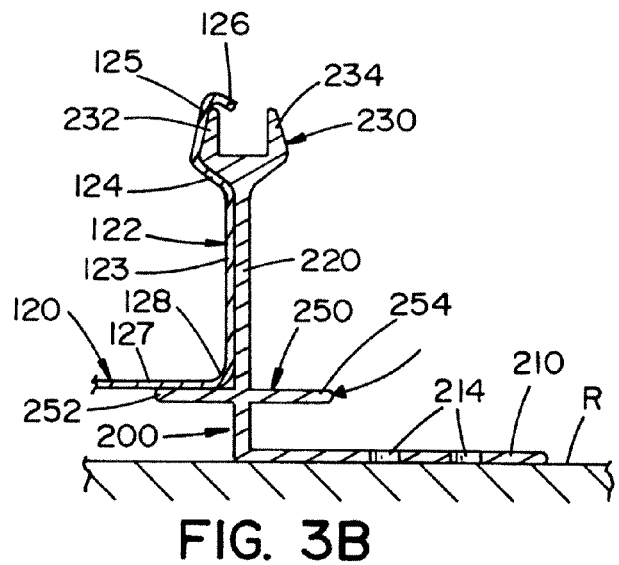
Figure 3C:
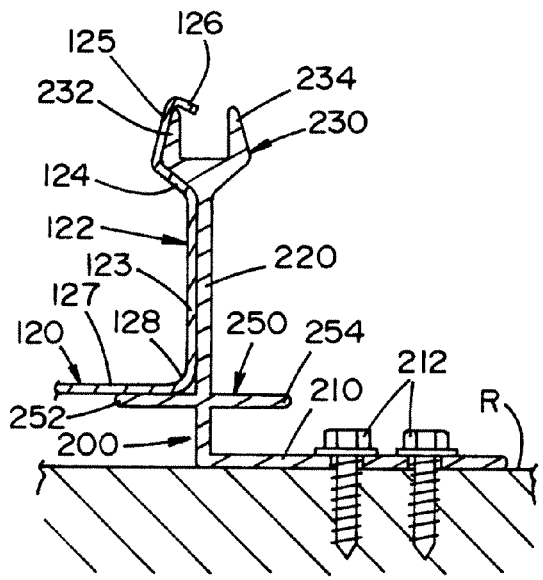
Figure 3D:
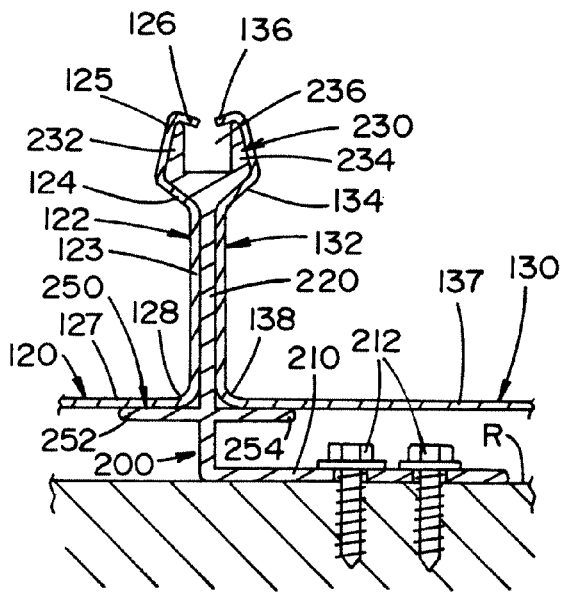
Figure 3E:
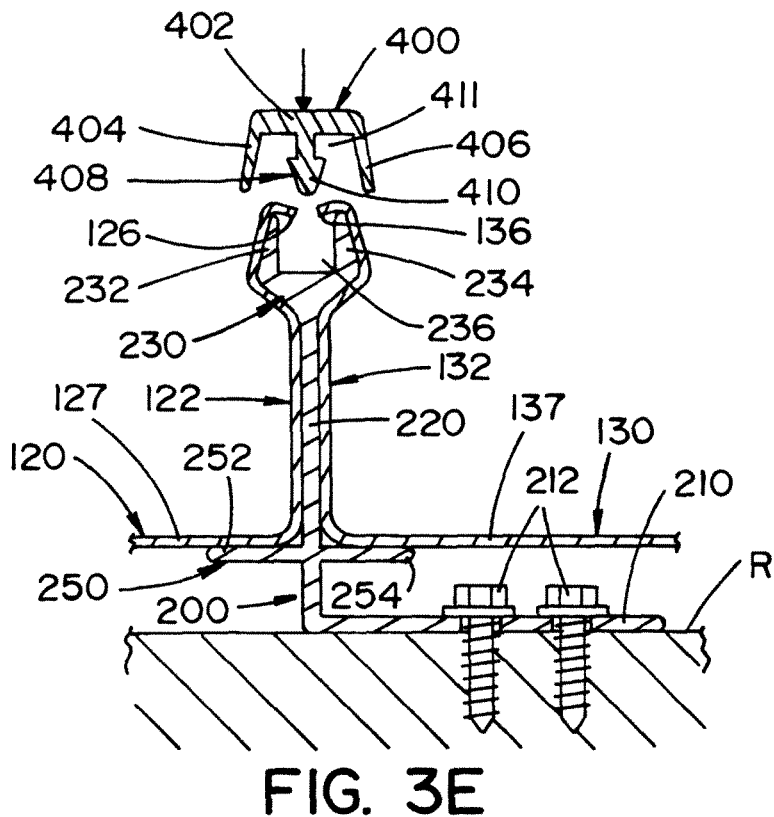

Referring now to FIGS. 3A-3H, a non-limiting method for securing a paneled roof system using the anchoring clip system illustrated in FIG. 2 is illustrated. It will be appreciated that the method disclosed in FIGS. 3A-3H can also be partially or fully used for the anchoring clip systems illustrated in FIGS. 4-11. Referring now to FIG. 3A, a roof panel 120 is provided and positioned on a roof substrate R. The roof panel includes a side flange 122 that has a preformed profile that closely matches the outer side profile of an anchoring clip 200.

FIG. 3B illustrates anchoring clip 200 being positioned on the roof substrate R. The roof panel 120 is positioned adjacent to the anchoring clip such that the side flange 122 closely follows the side profile of the anchoring clip. FIG. 3C illustrates the anchoring clip being secure to the roof substrate by two bolts 212. FIG. 3D illustrates that a second roof panel 130 is positioned closely adjacent to the other side of the anchoring clip. Similar to roof panel 120, roof panel 130 is a reformed panel that has a side flange 132 having a similar profile to the outer surface of the anchoring clip. The ends 126, 136 of the side flanges 122,132 are curved downward toward cavity 236 of the top flange portion 230 of the anchoring clip. The lower portion of side flanges 122, 132 lie in plane that is generally parallel to the vertical wall member 220 of the anchoring clip. A portion of the lower surface of bottom portion 127, 137 of roof panels 120, 130 rests on or is positioned slightly above shelf flanges 252, 254 of the anchoring clip.

Figure 3F:
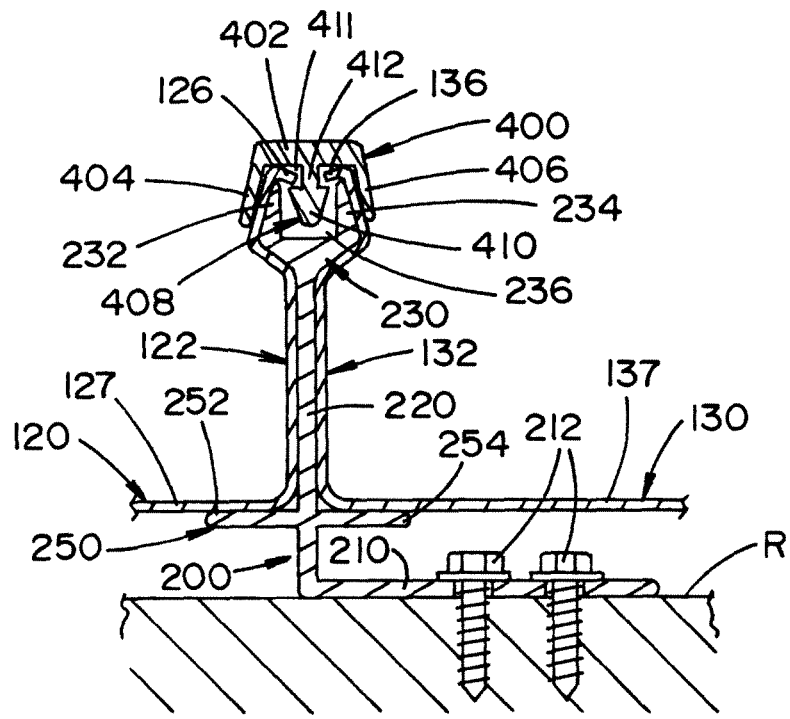

Referring now to FIGS. 3E and 3F, lock crown 400 is inserted onto the anchoring clip. The use of the locking crown is optional. The intermediate extender 408 is inserted into cavity 234 of the top flange portion 230 of the anchoring clip. As the intermediate extender 408 is inserted into cavity 234, the sides of end 410 of the intermediate extender 408 engage and partially deflect or bend ends 126, 136 of the side flanges as end 410 enters into cavity 234. As illustrated in FIG. 3F, end 410 is inserted past ends 126, 136 of the side flanges of the roof panels such that the two ends are positioned in notch cavity 411 of the locking crown, thus inhibiting or preventing the locking crown to be fully removed from the anchoring clip.

Figure 3G:
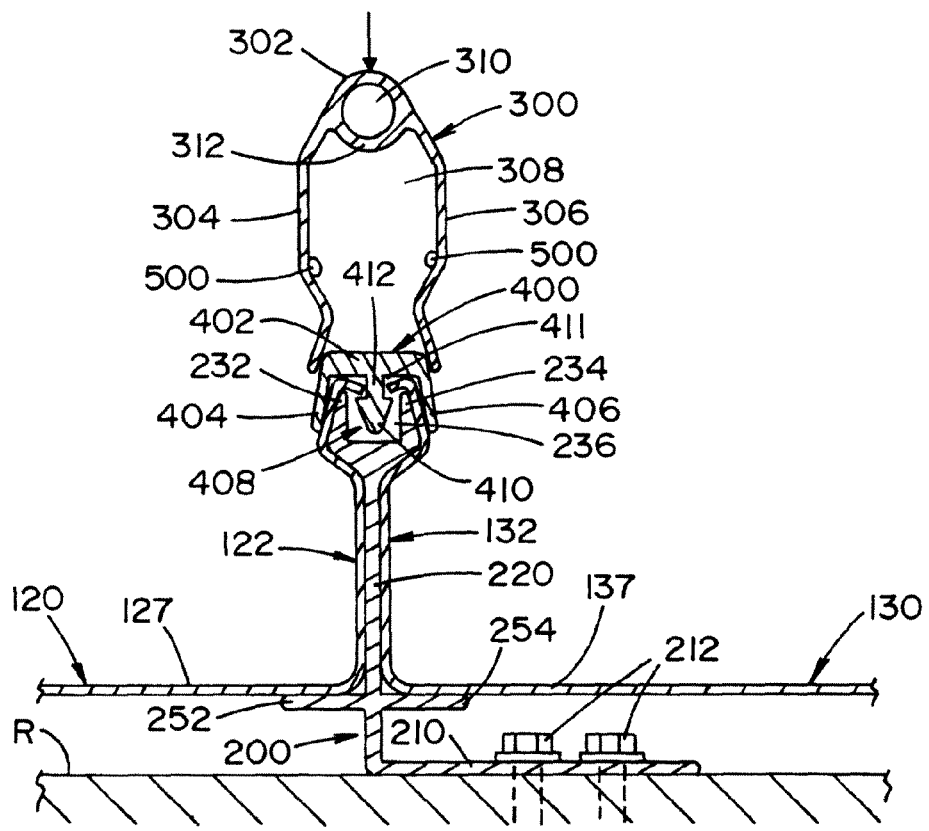
Figure 3H:
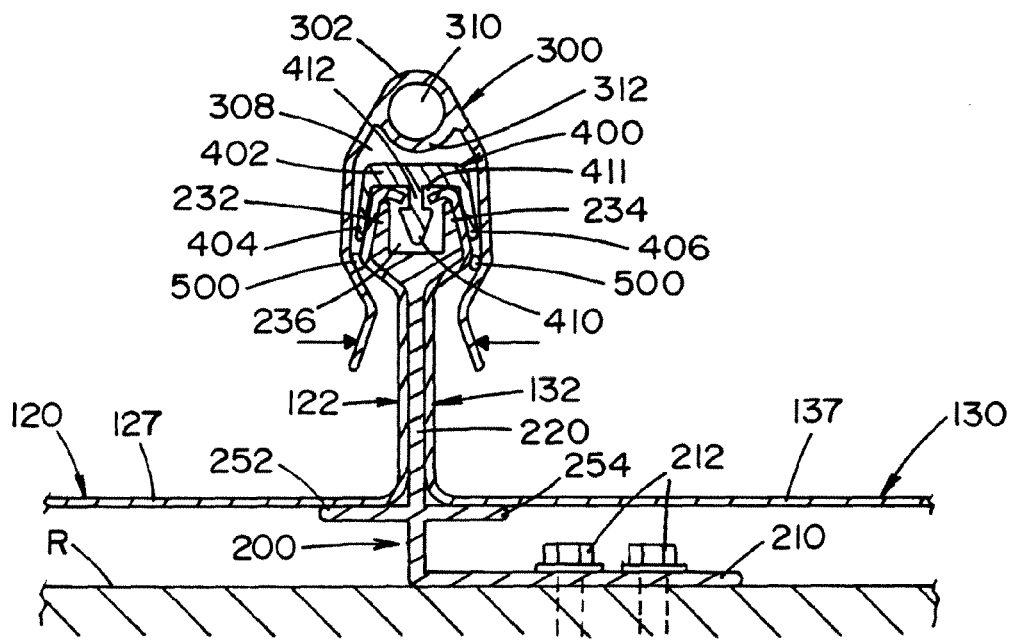

Referring now to FIGS. 3G and 3H, cap member 300 is inserted onto the anchoring clip to complete the anchoring clip system of the present invention. A sealant 500 is illustrated as being pre-applied to the inner surface of legs 304, 306 of the cap member. The legs of the cap member are slipped over the locking crown and upper region of the side flanges of the roof panels as illustrated in FIG. 3H. Thereafter, the legs are pressed and/or crimped together so that the lower portion of the legs of the cap member are positioned closely adjacent to the side flanges of the roof panels as illustrated in FIG. 2. Sealant 500 can be used to facilitate in the securing of the cap member to the side flanges; however, this is not required.

Once the roof system is installed, fluid channel 310 in the cap member can be incorporated into a heating/cooling system and/or energy generation system.

The anchoring clip system of the present invention has several advantages over prior art anchoring clip systems. One non-limiting advantage is that by utilizing an anchoring clip formed of one or more sections, such that the top flange portion can be connected to the vertical wall member of the anchoring clip (e.g., top flange portion can slide into and interlock with the vertical wall member as illustrated in FIGS. 10 and 11), the design of a roof system for wind uplift resistance may be optimized beyond the means currently available. One limitation of prior art anchoring clips is illustrated in the '045 patent is that the improved wind uplift resistance is achieved by creating a continuous anchoring clip over the full cross section when continuous anchoring of only a portion of the cross section may be necessary. This limitation of the prior art anchoring clips can render the use of such anchoring clip non-cost effective. Currently, individual and discreet anchoring clips must be placed at locations at which there is a supporting deck or sub frame (for instance every 60 inches on center). When such roofing sub-framing members are not provided in a pattern as required for the roofing system (for instance the roofing panel may require attachments every 43 inches on center), a continuous extruded full cross-section member may be provided by the anchoring clip illustrated in the '045 patent. The anchoring clip system of the present invention that utilizes a two piece anchoring clip allows for a partial cross-section of the anchoring clip (the base flange and wall member of the anchoring clip) to be utilized in a continuous fashion to span the roof sub-framing supports, while the top flange portion of the anchoring clip can be utilized in discreet segmented lengths (e.g., located every 43 inches on center immediately above the continuous base portion, etc.). Such an anchoring clip allows for a more economical means of providing an ideal and project-specific wind uplift resistance.

The configuration of the prior art anchoring clip of the '045 patent requires that the anchoring clip be used as a continuous anchoring clip of a full cross sectional area as a means to provide improved wind uplift resistance as compared to discreet individual and segmented anchor clips. The two piece anchoring clip of the present invention (e.g., top flange portion connectable to the vertical wall member as illustrated in FIGS. 10 and 11) allows for a continuous top flange portion to continuously engage the roofing panel flanges, while only discreet segmented lengths of the wall member and base flange of the anchoring clip can be used to provide a suitable attachment to the roof sub-framing or decking elements. Such an advantage conserves material cost thereby making the anchoring clip of the present invention more economical to use.

The two piece anchoring clip of the present invention (e.g., top flange portion connectable to the vertical wall member as illustrated in FIGS. 10 and 11) may be utilized to construct the roof panel system in a sequence that is not currently possible, which can further improve the wind uplift resistance of the roof panel system. Currently, roof panels are installed in a sequence limited to: 1) placing a first roof panel with side flange on the roof, 2) installing the anchoring clip to the roof substrate, 3) engaging the anchoring clip with the side flange of the first roof panel, 4) install second panel with a side flange on the roof, 5) engaging the anchoring clip with the side flange of the second roof panel, and 6) placing the batten clip over the two flange portions to secure the roof panels to the anchoring clip. The two piece anchoring clip of the present invention allows for a new installation sequence which will make possible a new and improved means for engaging the flanges of the two adjacent roof panels to the anchoring clip of the present invention. The new method is as follows: 1) placing the first panel on the roof, 2) installing the base portion of the anchoring clip to the roof substrate such that the side flange of the first panel engages or is positioned closely adjacent to the wall member of the anchoring clip, 3) installing the second panel with its side flange engaging or positioned closely adjacent to the wall member of the anchoring clip, 4) install the top flange portion of the anchoring clip or the top portion of the wall member by sliding the top flange portion onto the top portion of the wall member so that the top flange portion engages the groove in the side flanges of the two roof panels, and 5) placing the batten clip over the two flange portions to secure the roof panels to the anchoring clip of the present invention.

The anchoring clip system of the present invention has an additional or alternative advantage to increase the wind uplift resistance of the roof panel system by the use of a locking crown. The locking crown can be use with the single or multi-piece anchoring clip configuration to increase the wind uplift resistance of the roof panel system. The use of the locking crown can also include the strength and/or rigidity of the roof panel system.

The anchoring clip system of the present invention has an additional or alternative advantage in that can be used to facilitate in the integration of an active solar thermal energy collection system on a roof system. The anchoring clip system can be used to allow fluid to controllably flow through the anchoring clip system so as to collect energy for use in an active solar thermal energy collection system. One or more of the components of the anchoring clip system can be formed from traditional means (e.g., a sheet metal cold formed shape of uniform thickness, etc.), or a specialized extruded shape, or a combination of both. One or more of the components of the anchoring clip system can have a "closed" cross section—that is a cross section that cannot be formed from bending a sheet of uniform thickness metal. Such components (e.g., cap member, locking crown, etc.) can include an internal chamber along the full length of the component. The internal chamber in one or more of the components can be configured to share a portion of metal that is exposed to the exterior environment, thus would be contiguous with the remainder of the component; however, this is not required. By passing a fluid through the anchoring clip system, the heat energy of the sun can be conducted through the wall of the anchoring clip system and be absorbed by/transferred into the fluid flowing through the anchoring clip system. The heated fluid can be circulated back to a collector pipe and pumped through a traditional heat exchanger which can be used to heat potable water used by the occupants of the building and/or be used for some other or additional reason (e.g., heat pump to heat or cool a home, heating a pool, etc.). This method of solar thermal energy collection is novel and advantageous because it is aesthetically unobtrusive to the building exterior—"collector plates" and "fluid tubes" of traditional solar the al energy collection systems function identical to the fluid controllably flowing through the anchoring clip system; however, the anchoring clip system of the present invention causes or minimizes the visible variation to the appearance of the standing seam roof whereas the "collector plates" and "fluid tubes" of traditional solar thermal energy collection systems impair the look of a roof system. The integrated solar thermal energy collector created by the anchoring clip system of the present invention has an additional advantage in that the anchoring clip system adds very little extra weight to the roof surface as compared to "collector plates" and "fluid tubes" of traditional solar thermal energy collection systems. The integrated solar thermal energy collector created by the anchoring clip system minimizes or does not alter the building's seismic response frequency, nor requires any structural upgrades, as compared to other stand alone rooftop mounted dedicated solar thermal collector panels.

The anchoring clip system of the present invention can additionally or alternatively have the advantage of including the use of active selective coatings on the roof system. Coatings currently used for roof systems are designed as "cool colors"—the pigments are specifically selected and formulated to reflect up to 80% of all solar heat gain back into the atmosphere. This is generally beneficial as it greatly reduces the energy requirements for the building. Universal use of cool color roof coatings are a detriment to the efficiency of active solar thermal collector systems since the solar thermal collection devices are most effective when absorbing the maximum heat from the sun. The "active selective" coating system of the present invention can be designed to use "cool color" pigments on the exposed roof panel elements to reflect a significant amount of heat gain away from the main roof surface area while using "warm color" pigments on the anchoring clip system so the anchoring clip system would absorb a majority of the heat energy directed onto the anchoring clip system. For example, the "warm color" pigments on the anchoring clip system can be designed to readily absorb certain types of radiation (e.g., IR radiation, etc.); however, this is not required. Because pigments selectively reflect or absorb light from primarily the non-visible infra-red spectrum, the "warm color" pigments that are used on the anchoring clip system can be selected so that there is no noticeable difference in the visible color of the anchoring clip system and the roof panels. For example, the roof panels can have a white pigment that reflects a large portion of the radiation so as to form a "cool roof" and the anchoring clip system can include a white pigment that absorbs certain types of radiation so that the fluid passing through the anchoring clip system is heated by the absorbed radiation. However, since the pigments of the roof panels and the anchoring clip system are both white, the color of the roof panels and the anchoring clip system to the human eye would be the same or very similar, thus, preserving the aesthetics of the roof system.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A system for connecting roof or siding panels to a substructure comprising:
a) first and second panels, each of said panels having a channel section and a pair of opposed side flanges;
b) an anchoring clip system including an anchoring clip and a side flange securing arrangement; said anchoring clip having a base flange, a vertical wall member and a top flange portion; said base flange adapted to be connected to a substructure; said vertical wall member connected between said base flange and said top flange portion; said top flange portion including two flanges spaced from one another; said side flange securing arrangement designed to secure said side flanges of said first and second panels to said top flange portion of said anchoring clip; said side flange securing arrangement including a locking crown, a cap member, or combinations thereof; and,
c) a fluid channel arrangement designed to enable fluid to controllably flow through said anchoring clip system, said fluid channel arrangement preventing fluid flow between said first and second panels and to said substructure as fluid flows through said fluid channel arrangement, said fluid channel arrangement at least partially secured to or at least partially formed by said cap member, said fluid channel arrangement including i) a fluid channel fully formed on a top surface of a top portion of said cap member and extending a majority of a longitudinal length of said top portion, ii) a fluid channel fully formed on a bottom surface of said top portion of said cap member and at least partially positioned between two side legs, said fluid channel extending a majority of a longitudinal length of said top portion, iii) a fluid channel at least partially positioned in a cavity of said cap member, said cavity formed by a bottom surface of said top portion, an inner surface of said two side legs and a sealant, said fluid channel extending a majority of a longitudinal length of said top portion, iv) a fluid tube connected to a fluid tube connector at least partially positioned on a top surface of said top portion of said cap member, or v) a fluid tube connected to a fluid tube connector at least partially positioned in a cavity of said cap member, said cavity formed by a bottom surface of said top portion and an inner surface of said two side legs.

2. A system for connecting roof or siding panels to a substructure comprising:
a) first and second panels, each of said panels having a channel section and a pair of opposed side flanges;
b) an anchoring clip system including an anchoring clip and a side flange securing arrangement; said anchoring clip having a base flange, a vertical wall member and a top flange portion; said base flange adapted to be connected to a substructure; said vertical wall member connected between said base flange and said top flange portion; said top flange portion including two flanges spaced from one another; said a side flange securing arrangement designed to secure said side flanges of said first and second panels to said top flange portion of said anchoring clip; said side flange securing arrangement including a locking crown, a cap member, or combinations thereof;
c) a fluid channel arrangement designed to enable fluid to controllably flow through said anchoring clip arrangement, said fluid channel arrangement inhibiting or preventing fluid flow between said first and second panels and to said substructure as fluid flows through said fluid channel arrangement, said fluid channel arrangement at least partially secured to or at least partially formed by said cap member, said fluid channel arrangement including a) a fluid channel at least partially formed on a top surface of a top portion of said cap member and extending a majority of a longitudinal length of said top portion, b) a fluid channel at least partially formed on a bottom surface of said top portion of said cap member and at least partially positioned between two side legs, said fluid channel extending a majority of a longitudinal length of said top portion, c) a fluid channel at least partially positioned in a cavity of said cap member, said cavity formed by a bottom surface of said top portion and an inner surface of said two side legs, said fluid channel extending a majority of a longitudinal length of said top portion, d) a fluid tube connected to a fluid tube connector at least partially positioned on a top surface of said top portion of said cap member, or e) a fluid tube connected to a fluid tube connector at least partially positioned in a cavity of said cap member, said cavity formed by a bottom surface of said top portion and an inner surface of said two side legs; and, d) a locking crown and a cap member; said locking crown including a main body and two side legs extending downwardly from said main body; said locking crown designed to sandwich a portion of said side flanges of said first and second panels between said two side legs and said outer surface of said top flange portion of said anchoring clip when said locking crown is positioned about at least a portion of said anchoring clip; said cap member including a top portion and two side legs extending downwardly from said top portion; said cap member designed to be positioned about at least a portion of said locking crown and about at least a portion of said side flanges of said first and second panels when said cap member is positioned about at least a portion of said anchoring clip so as to facilitate in maintaining said locking crown and side flanges in position relative to said anchoring clip.

3. A system for connecting roof or siding panels to a substructure comprising:
  a) first and second panels, each of said panels having a channel section and a pair of opposed side flanges;
  b) an anchoring clip system including an anchoring clip and a side flange securing arrangement; said anchoring clip having a base flange, a vertical wall member and a top flange portion; said base flange adapted to be connected to a substructure; said vertical wall member connected between said base flange and said top flange portion; said top flange portion including two flanges spaced from one another; said a side flange securing arrangement designed to secure said side flanges of said first and second panels to said top flange portion of said anchoring clip; said side flange securing arrangement including a locking crown, a cap member, or combinations thereof;
  c) a fluid channel arrangement designed to enable fluid to controllably flow through said anchoring clip arrangement, said fluid channel arrangement inhibiting or preventing fluid flow between said first and second panels and to said substructure as fluid flows through said fluid channel arrangement, said fluid channel arrangement at least partially secured to or at least partially formed by said cap member; and,
  d) a locking crown and a cap member; said locking crown including a main body and two side legs extending downwardly from said main body; said locking crown designed to sandwich a portion of said side flanges of said first and second panels between said two side legs and said outer surface of said top flange portion of said anchoring clip when said locking crown is positioned about at least a portion of said anchoring clip; said cap member including a top portion and two side legs extending downwardly from said top portion; said cap member designed to be positioned about at least a portion of said locking crown and about at least a portion of said side flanges of said first and second panels when said cap member is positioned about at least a portion of said anchoring clip so as to facilitate in maintaining said locking crown and side flanges in position relative to said anchoring clip.

4. The system as defined in claim 2, wherein said locking crown includes an intermediate extender positioned between said two side legs and extending downwardly from said main body; said intermediate extender designed to be at least partially inserted between a cavity formed between said two flanges of said top flange portion when said locking crown is positioned about at least a portion of said anchoring clip.

5. The system as defined in claim 3, wherein said locking crown includes an intermediate extender positioned between said two side legs and extending downwardly from said main body; said intermediate extender designed to be at least partially inserted between a cavity formed between said two flanges of said top flange portion when said locking crown is positioned about at least a portion of said anchoring clip.

6. The system as defined in claim 2, wherein said fluid channel arrangement including a) a fluid channel at least partially formed on a top surface of said main body of said locking crown and extending a majority of a longitudinal length of said main body, b) a fluid channel at least partially formed on a bottom surface of said main body of said locking crown and at least partially positioned between said two side legs, said fluid channel extending a majority of a longitudinal length of said main body, c) a fluid channel fully formed in said main body of said locking crown and extending a majority of a longitudinal length of said main body, d) a fluid tube connected to a fluid tube connector at least partially positioned on a top surface of said main body of said locking crown, or e) a fluid tube connected to a fluid tube connector at least partially positioned in a cavity of said locking crown, said cavity formed by a bottom surface of said main body of said locking crown and an inner surface of said two side legs of said locking crown.

7. The system as defined in claim 6, wherein said fluid channel arrangement including a) a fluid channel at least partially formed on a top surface of said main body of said locking crown and extending a majority of a longitudinal length of said main body, b) a fluid channel at least partially formed on a bottom surface of said main body of said locking crown and at least partially positioned between said two side legs, said fluid channel extending a majority of a longitudinal length of said main body, c) a fluid channel fully formed in said main body of said locking crown and extending a majority of a longitudinal length of said main body, d) a fluid tube connected to a fluid tube connector at least partially positioned on a top surface of said main body of said locking crown, or e) a fluid tube connected to a fluid tube connector at least partially positioned in a cavity of said locking crown, said cavity formed by a bottom surface of said main body of said locking crown and an inner surface of said two side legs of said locking crown.

8. The system as defined in claim 1, wherein said anchoring clip includes i) multiple component pieces, ii) at least one shelf flange positioned between said base flange and said top flange portion, or combinations thereof 9. The system as defined in claim 7, wherein said anchoring clip includes i) multiple component pieces, ii) at least one shelf flange positioned between said base flange and said top flange portion, or combinations thereof 10. A system for connecting roof or siding panels to a substructure comprising:
  a) first and second panels, each of said panels having a channel section and a pair of opposed side flanges; and, b) an anchoring clip system including an anchoring clip, a locking crown and a cap member; said anchoring clip having a base flange, a vertical wall member and a top flange portion; said base flange adapted to be connected to a substructure; said vertical wall member connected between said base flange and said top flange portion; said top flange portion including two flanges spaced from one another; said locking crown including a main body and two side legs extending downwardly from said main body; said locking crown designed to sandwich a portion of said side flanges of said first and second panels between said two side legs and said outer surface of said top flange portion of said anchoring clip when said locking crown is positioned about at least a portion of said anchoring clip; said cap member including a top portion and two side legs extending downwardly from said top portion; said cap member designed to be positioned about at least a portion of said locking crown and about at least a portion of said side flanges of said first and second panels when said cap member is positioned about at least a portion of said anchoring clip so as to facilitate in maintaining said locking crown and side flanges in position relative to said anchoring clip; and, c) a fluid channel arrangement designed to enable fluid to controllably flow through said anchoring clip arrangement, said fluid channel arrangement inhibiting or preventing fluid flow between said first and second panels and to said substructure as fluid flows through said fluid channel arrangement, said fluid channel arrangement at least partially secured to or at least partially formed by said cap member, said locking crown, or combinations thereof 11. The system as defined in claim 10, wherein said locking crown includes an intermediate extender positioned between said two side legs and extending downwardly from said main body; said intermediate extender designed to be at least partially inserted between a cavity formed between said two flanges of said top flange portion when said locking crown is positioned about at least a portion of said anchoring clip.

12. The system as defined in claim 11, wherein at least a portion of said intermediate extender is designed to be locked in said cavity between said two flanges of said top flange portion by an end of said side flange of said first panel, an end of said side flange of said second panel, or combinations thereof.

13. The system as defined in claim 10, wherein said fluid channel arrangement including a) a fluid channel at least partially formed on a top surface of said top portion of said cap member and extending a majority of a longitudinal length of said top portion, b) a fluid channel at least partially formed on a bottom surface of said top portion of said cap member and at least partially positioned between said two side legs, said fluid channel extending a majority of a longitudinal length of said top portion, c) a fluid channel at least partially positioned in a cavity of said cap member, said cavity formed by a bottom surface of said top portion and an inner surface of said two side legs, said fluid channel extending a majority of a longitudinal length of said top portion, d) a fluid tube connected to a fluid tube connector at least partially positioned on a top surface of said top portion of said cap member, e) a fluid tube connected to a fluid tube connector at least partially positioned in a cavity of said cap member, said cavity formed by a bottom surface of said top portion of said cap member and an inner surface of said two side legs of said cap member, f) a fluid channel at least partially formed on a top surface of said main body of said locking crown and extending a majority of a longitudinal length of said main body, g) a fluid channel at least partially formed on a bottom surface of said main body of said locking crown and at least partially positioned between said two side legs, said fluid channel extending a majority of a longitudinal length of said main body, h) a fluid channel fully formed in said main body of said locking crown and extending a majority of a longitudinal length of said main body, i) a fluid tube connected to a fluid tube connector at least partially positioned on a top surface of said main body of said locking crown, or j) a fluid tube connected to a fluid tube connector at least partially positioned in a cavity of said locking crown, said cavity formed by a bottom surface of said main body of said locking crown and an inner surface of said two side legs of said locking crown.

14. The system as defined in claim 12, wherein said fluid channel arrangement including a) a fluid channel at least partially formed on a top surface of said top portion of said cap member and extending a majority of a longitudinal length of said top portion, b) a fluid channel at least partially formed on a bottom surface of said top portion of said cap member and at least partially positioned between said two side legs, said fluid channel extending a majority of a longitudinal length of said top portion, c) a fluid channel at least partially positioned in a cavity of said cap member, said cavity formed by a bottom surface of said top portion and an inner surface of said two side legs, said fluid channel extending a majority of a longitudinal length of said top portion, d) a fluid tube connected to a fluid tube connector at least partially positioned on a top surface of said top portion of said cap member, e) a fluid tube connected to a fluid tube connector at least partially positioned in a cavity of said cap member, said cavity formed by a bottom surface of said top portion of said cap member and an inner surface of said two side legs of said cap member, f) a fluid channel at least partially formed on a top surface of said main body of said locking crown and extending a majority of a longitudinal length of said main body, g) a fluid channel at least partially formed on a bottom surface of said main body of said locking crown and at least partially positioned between said two side legs, said fluid channel extending a majority of a longitudinal length of said main body, h) a fluid channel fully formed in said main body of said locking crown and extending a majority of a longitudinal length of said main body, i) a fluid tube connected to a fluid tube connector at least partially positioned on a top surface of said main body of said locking crown, or j) a fluid tube connected to a fluid tube connector at least partially positioned in a cavity of said locking crown, said cavity formed by a bottom surface of said main body of said locking crown and an inner surface of said two side legs of said locking crown.

15. A cap member used to connect roof or siding panels to an anchoring clip that is connected to a substructure, said cap member comprising a top portion, two side legs extending downwardly from said top portion and a fluid channel arrangement, said fluid channel designed to prevent fluid that is flowing through said fluid channel arrangement from flowing to said substructure, said fluid channel arrangement including a) a fluid channel at least partially fully formed on a top surface of said top portion and extending a majority of a longitudinal length of said top portion, b) a fluid channel at least partially fully formed on a bottom surface of said top portion and at least partially positioned between said two side legs, said fluid channel extending a majority of a longitudinal length of said top portion, c) a fluid channel at least partially positioned in a cavity of said cap member, said cavity formed by a bottom surface of said top portion and an inner surface of said two side legs, said fluid channel extending a majority of a longitudinal length of said top portion, d) a fluid tube connected to a fluid tube connector at least partially positioned on a top surface of said top portion, or d) a fluid tube connected to a fluid tube connector at least partially positioned in a cavity of said cap member, said cavity formed by a bottom surface of said top portion and an inner surface of said two side legs.

16. A system for connecting roof or siding panels to a substructure comprising:
    a) first and second panels, each of said panels having a channel section and a pair of opposed side flanges;
    b) an anchoring clip system including an anchoring clip and a side flange securing arrangement; said anchoring clip having a base flange, a vertical wall member and a top flange portion; said base flange adapted to be connected to a substructure; said vertical wall member connected between said base flange and said top flange portion; said top flange portion including two flanges spaced from one another; said side flange securing arrangement designed to secure said side flanges of said first and second panels to said top flange portion of said anchoring clip; said side flange securing arrangement including a locking crown, a cap member, or combinations thereof;
    c) a locking crown and a cap member; said locking crown including a main body and two side legs extending downwardly from said main body; said locking crown designed to sandwich a portion of said side flanges of said first and second panels between said two side legs and said outer surface of said top flange portion of said anchoring clip when said locking crown is positioned about at least a portion of said anchoring clip; said cap member including a top portion and two side legs extending downwardly from said top portion; said cap member designed to be positioned about at least a portion of said locking crown and about at least a portion of said side flanges of said first and second panels when said cap member is positioned about at least a portion of said anchoring clip so as to facilitate in maintaining said locking crown and side flanges in position relative to said anchoring clip; and,
    d) a fluid channel arrangement designed to enable fluid to controllably flow through said anchoring clip arrangement, said fluid channel arrangement inhibiting or preventing fluid flow between said first and second panels and to said substructure as fluid flows through said fluid channel arrangement, said fluid channel arrangement at least partially secured to or at least partially formed by said cap member, said locking crown or combinations thereof, said fluid channel arrangement including a) a fluid channel at least partially formed on a top surface of said top portion of said cap member and extending a majority of a longitudinal length of said top portion, b) a fluid channel at least partially formed on a bottom surface of said top portion of said cap member and at least partially positioned between said two side legs, said fluid channel extending a majority of a longitudinal length of said top portion, c) a fluid channel at least partially positioned in a cavity of said cap member, said cavity formed by a bottom surface of said top portion and an inner surface of said two side legs, said fluid channel extending a majority of a longitudinal length of said top portion, d) a fluid tube connected to a fluid tube connector at least partially positioned on a top surface of said top portion of said cap member, e) a fluid tube connected to a fluid tube connector at least partially positioned in a cavity of said cap member, said cavity formed by a bottom surface of said top portion and an inner surface of said two side legs, f) a fluid channel at least partially formed on a top surface of said main body of said locking crown and extending a majority of a longitudinal length of said main body, g) a fluid channel at least partially formed on a bottom surface of said main body of said locking crown and at least partially positioned between said two side legs, said fluid channel extending a majority of a longitudinal length of said main body, h) a fluid channel fully formed in said main body of said locking crown and extending a majority of a longitudinal length of said main body, d) a fluid tube connected to a fluid tube connector at least partially positioned on a top surface of said main body of said locking crown, or i) a fluid tube connected to a fluid tube connector at least partially positioned in a cavity of said locking crown, said cavity formed by a bottom surface of said main body of said locking crown and an inner surface of said two side legs of said locking crown.

17. A system for connecting roof or siding panels to a substructure comprising:
    a) first and second panels, each of said panels having a channel section and a pair of opposed side flanges;
    b) an anchoring clip system including an anchoring clip and a side flange securing arrangement; said anchoring clip having a top flange portion; said side flange securing arrangement designed to secure said side flanges of said first and second panels to said top flange portion of said anchoring clip; said side flange securing arrangement including a cap member; said cap member including a top portion and two side legs extending downwardly from said top portion; said cap member designed to be positioned about at least a portion of said side flanges of said first and second panels when said cap member is positioned about at least a portion of said anchoring clip so as to facilitate in maintaining said side flanges in position relative to said anchoring clip; and,
    c) a fluid channel arrangement designed to enable fluid to controllably flow through said anchoring clip arrangement, said fluid channel arrangement preventing fluid flow between said first and second panels and to said substructure as fluid flows through said fluid channel arrangement, said fluid channel arrangement at least partially secured to or at least partially formed by said cap member, said fluid channel arrangement including a structure selected from the group consisting of i) a fluid channel at least partially fully formed on a top surface of said top portion of said cap member and extending a majority of a longitudinal length of said top portion, ii) a fluid channel at least partially fully formed on a bottom surface of said top portion of said cap member and at least partially positioned between said two side legs, said fluid channel extending a majority of a longitudinal length of said top portion, iii) a fluid channel at least partially positioned in a cavity of said cap member, said cavity formed by a bottom surface of said top portion, an inner surface of said two side legs and a sealant, said fluid channel extending a majority of a longitudinal length of said top portion, iv) a fluid tube connected to a fluid tube connector at least partially positioned on a top surface of said top portion of said cap member, or v) a fluid tube connected to a fluid tube connector at least partially positioned in a cavity of said cap member, said cavity formed by a bottom surface of said top portion and an inner surface of said two side legs.

* * * * *